US012560715B2

(12) United States Patent
Winder

(10) Patent No.: US 12,560,715 B2
(45) Date of Patent: Feb. 24, 2026

(54) ACOUSTICAL APPLICATIONS OF MODULATION BEAMFORMING TECHNOLOGY

(71) Applicant: SONOGEN MEDICAL, INC., Chevy Chase, MD (US)

(72) Inventor: Alan Winder, Westport, CT (US)

(73) Assignee: SONOGEN MEDICAL, INC., Chevy Chase, MD (US)

( * ) Notice: Subject to any disclaimer, the term of this patent is extended or adjusted under 35 U.S.C. 154(b) by 311 days.

(21) Appl. No.: 18/255,840

(22) PCT Filed: Dec. 2, 2020

(86) PCT No.: PCT/US2020/062877
§ 371 (c)(1),
(2) Date: Jun. 2, 2023

(87) PCT Pub. No.: WO2022/119567
PCT Pub. Date: Jun. 9, 2022

(65) Prior Publication Data
US 2024/0004063 A1     Jan. 4, 2024

(51) Int. Cl.
*G01S 15/89* (2006.01)
*G01S 7/52* (2006.01)

(52) U.S. Cl.
CPC ........ *G01S 15/8952* (2013.01); *G01S 7/5202* (2013.01); *G01S 7/52026* (2013.01)

(58) Field of Classification Search
CPC ............... G01S 15/8952; G01S 7/5202; G01S 7/52026
See application file for complete search history.

(56) References Cited

U.S. PATENT DOCUMENTS

| | | | | |
|---|---|---|---|---|
| 2004/0264707 A1* | 12/2004 | Yang | ...................... | G10K 15/02 |
| | | | | 381/79 |
| 2014/0128740 A1* | 5/2014 | Chiang | .................. | A61B 8/546 |
| | | | | 600/459 |
| 2020/0085407 A1* | 3/2020 | Grundfest | .............. | A61B 8/085 |

FOREIGN PATENT DOCUMENTS

| | | |
|---|---|---|
| WO | 2013066821 A2 | 5/2013 |
| WO | WO 2020011944 | 1/2020 |

OTHER PUBLICATIONS

Supplementary European Search Report dated Jun. 12, 2024, in related European Patent 20964423, 2 pages.

(Continued)

*Primary Examiner* — Abdallah Abulaban
(74) *Attorney, Agent, or Firm* — F. CHAU & ASSOCIATES, LLC

(57) ABSTRACT

A method for generating a spatial distribution of acoustic transmitting frequencies by a time modulated array (TMA) of transducers includes generating, by a tapped delay line, a plurality of pulsed sampling signals, wherein each pulsed sampling signal includes a series of frequency harmonics and successive signals of the plurality of pulsed sampling signals are separated by a predetermined delay time; mixing each of the plurality of pulsed sampling signals with a time-limited information signal wherein a plurality of mixer output signals is generated; bandpass filtering each of the plurality of mixer output signals; generating a first plurality of simultaneous TMA beams from the plurality of filtered and weighted output signals by driving a plurality of acoustic transducers in a spatial array of acoustic transducers, wherein each beam of the first plurality of simultaneous beams is associated with one of a plurality of transmitting carrier frequencies

28 Claims, 9 Drawing Sheets

(56)  References Cited

OTHER PUBLICATIONS

Ding, et al., "Time-Modulated OFDM Directional Modulation Transmitters", in IEEE Transactions on Vehicular Technology, vol. 68, No. 8, Aug. 2019, pp. 8249-8253.

* cited by examiner

SPACE-FREQUENCY DIVERSITY BEAMFORMING
REDUCES CROSS-BEAM REVERBERATION BUILD-UP

NORMAL RDT MODE (A)

SPATIAL DECOUPLING

TMA MODE (B)

FFT RECEIVER FOR TMA TRANSMISSIONS

NORMAL OPERATION

SIG_GEN; FREQ
1 MHZ;REP RATE
1 KHZ;PW 200µs
71

SIGNAL
CONDITIONER
72

POWER
AMPLIFIER
388 mW RMS
73

SATA=50 mW/cm²
ACOUSTIC RMS
POWER = 194 mW
ERA = 3.88 cm²

CIRCULAR
PISTON
TRANSDUCER*

BW$_{-6dB}$:0.8-1.2 MHZ
74

* Assumes Eff 50%
* Embedded AMC

TMA OPERATION

DELAY=6.66667 $\mu secs$          0.8-1.2 MHZ

ACOUSTICAL APPLICATIONS OF MODULATION BEAMFORMING TECHNOLOGY

CROSS-REFERENCE TO RELATED APPLICATION

This application is a National Phase of PCT application PCT/US2020/062877, filed on Dec. 2, 2020, in the U.S. Receiving Office, the contents of which are herein incorporated by reference in their entirety.

BACKGROUND

Technical Field

Embodiments of the present disclosure are directed to using a time-modulated array (TMA) to obtain space-frequency diversity beamforming to significantly enhance target interrogation under noise-limited and clutter-limited conditions. The target may be biological or non-biological in composition.

Discussion of the Related Art

A TMA system is characterized by time-modulating each array element of a transducer array to produce simultaneous beam steering, where each beam is associated with a different carrier frequency. The inherent physics is appropriate for either electro-magnetic or acoustic transmissions [1], but the remainder of this disclosure will be primarily directed to acoustical applications.

After the effectiveness of sonar and radar systems were demonstrated in WWII, the next three decades saw improvements in the temporal and spatial properties of the acoustic and electromagnetic waves in their respective propagation media: the oceans and the atmospheric strata. From 1945 to 1975, considerable advances and innovation were made in space-time radar signal processing by applying time-frequency domain techniques in electronic scanning of antenna systems. In the meantime, the U.S. Navy's research efforts concentrated on characterizing the multi-modal acoustic properties of ocean behavior and applying radar and astronomy processing techniques to sonar [1-3].

The following is a brief review of significant research papers in the fields of both radar and sonar on the related art of TMAs.

One of the early outstanding researchers in the field was Shelkunoff [4], who in 1941 presented a general method of antenna analysis based on Maxwell's equations and circuit theory principles. Shelkunoff's method improved the understanding of the transmission process and facilitated the computation of the input impedance of antennas of arbitrary shape. In 1943, Schelkunoff [5] presented a mathematical method that influenced space-time diversity methods proposed in the 1960s: Shnitkin [6], Shanks [7]. Kummer et al [8], Davies and McCartney [9], and Johnson [10]. These advancements are specifically relevant to the use of TMAs, which is characterized by applying modulation and coding techniques to beam steering of transmit and receive beams, and by obtaining ultra-low sidelobes to minimize off-axis interference.

Shnitkin (1960-1961) presented a survey of electronically scanned antennae comprised of beam switching, phase shifting, and frequency scanning. Electronic scanning replaced the repositioning of large and heavy antennae by mechanical means, which required large moments of inertia and caused structural stresses that produced antenna distortion and deterioration of radiation patterns. A technical approach was introduced, primarily to receiving systems, to circumvent the need for high speed, high accuracy RF phase shifters that considered frequency conversion phasing schemes.

Shanks (1959-1961) enhanced the concept of a time-modulated antenna by recognizing that amplitude modulating the transmitting carrier plane wave with a Fourier spatial-temporal series generated a time-varying radiation pattern. Time-multiplexing the element signals produces a frequency-multiplexed beam signal that can be used for beam steering. This is a consequence of the Fourier transform relationship between the array aperture and the far-field pattern space. Control of the modulation frequency, duty cycle, pulse repetition rate, as well as other modulation parameters with respect to the array geometry, supports the potential of the TMA concept to achieve specific operational objectives in real environments.

It was now no longer necessary to control the phase between elements for sidelobe control as presented by Shnitkin. Instead, simple on-off element switching in a progressive manner could be employed for both transmit and receive arrays. Kummer et al (1962) applied this switching technique to a receiving antenna array to produce a −50 dB Chebyshev sidelobe level from a normal uniform −13 dB static distribution for a linear array.

Electronically beam scanned arrays were initially applied almost exclusively to linear or rectangular planar arrays. Davies and McCartney (1965) showed that these principles could also be applied to convex geometries, such as circular and cylindrical arrays. Finally, following Shanks, Johnson (1968) applied time and frequency multiplexing to linear and ring receiving arrays.

During the 1960s, considerable research was conducted by the U.S. Department of Defense, most notably the now-defunct U.S. Navy Underwater Sound Laboratory in New London, CT. System architecture became more complex, and performance assessment required new metrics in computing the reverberation masking level. In 1968, Cole and Hanrahan [11] extended the reverberation index (RI), introduced in 1948 by Eyring et al [12], as a measure of the discrimination against reverberation (clutter) associated with single transmitter and receiver acoustic power intensity patterns. The RI was used to optimize multiple transmissions and high search rates for multi-acoustic mode operation, such as shallow-water, surface-duct, convergence zone and bottom-bounce propagation in deep water [15]. In this period, the focus was also in the area of nonlinear acoustics, most notably by Westerfelt [13; 1963], who investigated the area of interacting primary frequencies generated by an array referred to as an active parametric array.

Experimental sonar research in the 1970s focused on understanding the limitations of reverberation in multi-modal operation and assessing the application of coding principles to beamforming. Among the many fine contributors in this period are Vogliss [14], Winder [15], and Haykin [16].

The basic principles of receive beam scanning using matrix formulation were developed by Vogliss, who discussed limitations such as the scanning speed, the number of modulating frequencies in Part 1 [1971], and the design flexibility in Part 2 [1972].

A general overview of the state-of-the-art in sonar system technology was presented by Winder [1975] that reviewed the various acoustic transmission and signal processing technologies commonly employed and the major associated operational considerations, such as the cross-beam reverberation build-up and the incurred blind zone re scanning time.

Haykin (1976) expanded on the multiple-beam sampler architecture of Johnson by employing a structure similar to the Fast Fourier transform to reduce the hardware, resulting in greater reduction in circuit complexity as the number of elements increases.

For the past 60 years, the TMA concept primarily addressed the architecture of receiving arrays, primarily due to the advancements in FFT processing and micro-minimization. The real value of TMA is on transmit, where beams can be directed and optimized in multi-mode transmissions to maximize the signal-to-masking noise ratio on receive, utilizing frequency to spatially-decouple the clutter or reverberation on receive and to significantly simplify the receiver architecture by employing high resolution FFT spectral algorithms, for both radar and sonar applications. The concept of spatial decoupling is to convert coherent summation to incoherent summation, that is, being linear on the basis of energy, such as white noise, instead of being linear on the basis of amplitude.

It is thus desirable to provide TMA design to be efficient and functional within specific operational transmit constraints of real applications utilizing arrays of various geometry such as linear, convex, planar and parametric.

It is also desirable to provide real-time operational TMA systems that consider transmit design constraints such as interbeam interference within the transmitting bandwidth, bearing-doppler ambiguity, and spectra leakage interference from outside the passband.

In addition, it is desirable to provide real-time operational TMA systems that consider design constraints such as the power amplifier source level and peak power rating in transmit, and the cross-beam reverberation or clutter masking level in receive.

SUMMARY

Embodiments of the present disclosure are directed to using a time-modulated array (TMA) to obtain space-frequency diversity beamforming to significantly enhance target interrogation under noise-limited and clutter-limited conditions. The target may be biological or non-biological in composition. Depending on the application, real-time operational TMA systems consider design constraints such as interbeam interference within the transmitting bandwidth, bearing-doppler ambiguity, spectra leakage interference from outside the passband, power amplifier transmit source level, and peak power rating in transmit and cross-beam reverberation or clutter masking level in receive. These system design requirements were not considered in previous research on multi-beamforming systems.

According to an embodiment of the disclosure, there is provided method for generating a spatial distribution of acoustic transmitting frequencies by a time modulated array (TMA) of transducers that permit simultaneous multiple beam steering, including generating, by a tapped delay line, a plurality of pulsed sampling signals, wherein each pulsed sampling signal includes a series of frequency harmonics and successive signals of the plurality of pulsed sampling signals are separated by a predetermined delay time, mixing each of the plurality of pulsed sampling signals with a time-limited information signal wherein a plurality of mixer output signals is generated, bandpass filtering each of the plurality of mixer output signals, and generating a first plurality of simultaneous TMS beams from the plurality of filtered and weighted output signals by driving a plurality of acoustic transducers in a spatial array of acoustic transducers. Each beam of the first plurality of simultaneous beams is associated with one of a plurality of transmitting carrier frequencies, and the first plurality of simultaneous beams are subject to design constraints that control a bearing target doppler ambiguity, a uniform response in bearing, out-of-band spectra leakage interference, peak power level, and cross-beam reverberation. A secondary plurality of beams is formed that includes a plurality of different primary carrier frequencies that intersect the first plurality of simultaneous TMA beams in a far-field and based on nonlinear properties of a propagation medium, and a parametric sonar array is produced. Multiple echo frequencies are received and processed by a spectrum analyzer, where each spectral component of the multiple echo frequencies corresponds to a unique spatial bearing.

According to a further embodiment of the disclosure, the method includes producing a spectral component with a phase slope that corresponds to a particular beam steering angle by time-modulating each array element in a spatial array.

According to a further embodiment of the disclosure, the spatial beamformer comprises two sub-beamformers, wherein one or both are TMA beamformers, whose output intersects in a specific region in the far-field with one or more common maximum response axes (MRAs).

According to a further embodiment of the disclosure, the spatial array is an N-point element linear array with constant element spacing d and a time-varying far-field pressure for a monochromatic signal is given as:

$$p(\theta, t) = \sum_p a_p \sum_m W_m$$
$$\left\{ \exp\left(j2\pi m\left[\frac{(f_r + \epsilon f_0 + pf_s)d\sin(\theta)}{c} - \frac{p}{N}\right]\right) \times \exp\left(j2\pi(f_r + \epsilon f_0 + pf_s)t\right)\right\},$$

wherein $\theta$ is a pointing angle, which is a direction of maximum response for a particular beam associated with a harmonic number, $a_p$ are weighting coefficients for each harmonic p, $W_m$ is a complex weighting for each element m, $f_r$ is a reference frequency, $f_s$ is a fundamental harmonic frequency, $f_o$ is a transmit frequency, p ranges from a first harmonic $P_o$ to a last harmonic $P_c$, c is the speed of sound, and $\epsilon$ is +1 or −1 depending on whether a sum or difference frequency band is retained.

According to a further embodiment of the disclosure, the method includes choosing a total delay time $\tau$ equal to a sampling period, $N\tau = 1/f_s$, wherein $\tau = -d \sin(\theta)/c$, and the pointing angle $\theta$ is a function of the harmonic parameters (p) and ($f_s$), the center frequency $f_c = f_r + \epsilon f_o$, and the array parameters (N) and (d).

According to a further embodiment of the disclosure, the design constraints include a sampling frequency $f_s$ that is at least: $f_s = F_D + 6/T$, wherein $f_D$ is the maximum doppler and T is the signal pulse length.

According to a further embodiment of the disclosure, the design constraints include a design constraint that controls out-of-band spectra leakage interference that is $2f \geq (P_c - P_o)$ $f_s$, wherein ($f_s$) is a sampling frequency that includes spreading due to source, target and receiver speeds.

According to a further embodiment of the disclosure, the pointing angle $\theta p = \sin^{-1}[2\pi p/(Nk_p d)]$, wherein $k_p$ is a harmonic dependent wave-number that equals $2\pi(f_r + \epsilon f_o + pf_s)/c$.

According to a further embodiment of the disclosure, when the information signal is s(t) has a complex Fourier spectrum S(f), the time-varying far-field pressure is expressed by:

$$p(\theta, t) = \sum_p a_p$$

$$\int df' S(f') \left\{ \sum_m W_m \left\{ \exp\left( j2\pi m \left[ \frac{(f' + f_r + \epsilon f_0 + pf_s)d \sin(\theta)}{c} - p/N \right] \right) \right\} \times \right.$$

$$\left. \exp\left( j2\pi (f' + f_r + \epsilon f_0 + pf_s)t \right) \right\}.$$

According to a further embodiment of the disclosure, the total peak power required for M tonals is $(2M^2 P_{rms})$, wherein $P_{rms}$ is an rms power per tonal required for a specified source level.

According to a further embodiment of the disclosure, a transmit source level of the TMA $SL_{TMA}$ for the linear array with a constant input electrical power is equal to transmit source level of the linear array $SL_{LIN}$ reduced by the number of frequency coded beams according to $SL_{TMA} = SL_{LIN} - 10$ log M, wherein $SL_{TMA} = 20$ log rms pressure on the MRA.

According to a further embodiment of the disclosure, the spatial array is an N-point element circular array with constant angular element spacing $\zeta$, and a time-varying far-field pressure for an arbitrary signal with complex Fourier spectrum S(f') is given as: $p(\theta,t) = \sum_p a_p \int df' S(f') \{ \sum_m W_m \exp(-j2\pi[(f_p(R/c)(\cos(\theta - m\varsigma) - \cos(\theta) + pm/N))]) \} \times \exp(j2\pi f_p t)$, wherein $\theta$ is a pointing angle, which is a direction of maximum response for a particular beam associated with a harmonic number, $a_p$ are weighting coefficients for each harmonic p, $W_m$ is a complex weighting for each element m, $f_p = (f' + f_r + \epsilon f_o + pf_s)$ where $f_r$ is a reference frequency, $f_s$ is a fundamental harmonic frequency, $f_o$ is a transmit frequency, p ranges from a first harmonic $P_o$ to a last harmonic $P_c$, R is the radius of the circular array, c is the speed of sound, and $\epsilon$ is +1 or −1 depending on whether a sum or difference frequency band is retained.

According to a further embodiment of the disclosure, the method includes additional phase weightings that enhance spatial filtering, wherein each element is phased back-to-a-line or to a circular arc for maximum echo-to-noise ratio.

According to a further embodiment of the disclosure, the method includes selecting frequencies that decrease the coherence of the spatially interacting beams that transmit major lobes wherein one or more of a cross-beam masking clutter or a reverberation level is reduced.

According to a further embodiment of the disclosure, the spatial array is a planar array of $N_1$-point elements with an inter-element $d_1$-spacing in a first direction and $N_2$-point elements with an inter-element $d_2$-spacing in a second direction that is excited by complex signal $s(t) = 2u(t)\cos \omega_o t$ u(t) that represents a low-frequency amplitude modulation u(t) with carrier frequency $\omega_o$ and whose complex Fourier spectrum is $S(\omega') = U(\omega' + \omega_o) + U(\omega' - \omega_o)$, wherein a time-varying far-field pressure for an arbitrary signal with complex Fourier spectrum S(f') is given as:

$$p(\alpha, \beta, t) = \frac{1}{2\pi} \sum_{P_1, P_2} a_{p_1} a_{p_2}$$

$$\int d\omega' U(\omega' - \epsilon_1 \omega_0) \left\{ \exp\left( j(m_1 - 1) \left[ \frac{\omega_{12} d_1 \cos(\alpha)}{c} - \frac{2\pi p_1}{N_1} \right] \right) \right\} \times$$

-continued $$\left\{ \exp\left( j(m_2 - 1) \left[ \frac{\omega_{12} d_2 \cos(\beta)}{c} - \frac{2\pi p_2}{N_2} \right] \right) \right\},$$

where $\alpha$ and $\beta$ are the direction cosines of a far-field observation point with respect to the 1-direction and 2-direction, respectively, $\omega_{12} = \omega_{r_1} + \omega' + \epsilon_2 \omega_{r_2} + p_1 \omega_{s_1} + p_2 \omega_{s_2}$ is a frequency of a $p_1 p_2$-harmonic, and c is the speed of sound, wherein the direction cosines of the individual beam MRA's are defined as: $\cos \alpha = (2\pi p_1/N_1)(c/d_1 \omega_{12})$, and $\cos \beta(2\pi p_2/N_2)(c/d_2 \omega_{12})$.

According to a further embodiment of the disclosure, the spatial array further comprises a dual beamformer that generates a set of collinear first difference primary frequencies, wherein the first beamformer includes a set of beams of a multi-element TMA array and a second beamformer produces a wide-beam that encompasses all major TMA transmission lobes for deep depth underwater applications, wherein a source level of the wide beam is equal to a peak source level of the TMA array.

According to a further embodiment of the disclosure, the set of collinear first difference primary frequencies $\{\Delta f_i\}$ is defined as $\{\Delta f_i\} = |\{\text{WideBeam}\} - \{\text{TMA}_i\}|_{abs} = \{16 \text{ kHz}\} - \{12.17 \text{ kHz}, 13.00 \text{ kHz}, 13.83 \text{ kHz}, 14.68 \text{ kHz}\} = \{3.83 \text{ kHz}, 3.0 \text{ kHz}, 2.17 \text{ kHz}, 1.34 \text{ kHz}\}$.

According to a further embodiment of the disclosure, the collinear first difference frequencies include transmission spectra whose echoes are input to a spectrum analyzer.

According to a further embodiment of the disclosure, the collinear first difference frequencies for the parametric array maintain a high efficiency in the demodulation process, wherein the frequency down-ratio is 3-to-10.

According to a further embodiment of the disclosure, the method includes filtering each of the plurality of mixer output signals wherein one of a sum-frequency sideband or a difference frequency sideband is filtered from each of the plurality of mixer output signals.

According to a further embodiment of the disclosure, the method includes complex weighting each of the plurality of mixer output signals.

According to a further embodiment of the disclosure, the bandpass filtering is one of a sum frequency band pass filtering or a difference frequency bandpass filtering:

According to a further embodiment of the disclosure, the different primary carrier frequencies of the plurality of different primary carrier frequencies are one of lower primary carrier frequencies or higher primary carrier frequencies.

According to another embodiment of the disclosure, there is provided an acoustic space-frequency diversity system that includes a tapped delay line includes a plurality of taps that generate a plurality of pulsed sampling signals, wherein each tap generates one of the plurality of pulsed sampling signals, each pulsed sampling signal includes a series of frequency harmonics, and successive signals of the plurality of pulsed sampling signals are separated by a predetermined delay time; a plurality of mixers, wherein each mixer of the plurality of mixers combines one of the plurality of pulsed sampling signals with an a time limited information signal to generate one of a plurality of mixer output signals; and a spatial array of transducer elements, where each transducer element of the spatial array of transducer elements receives one of the plurality of mixer output signals. The spatial array of transducer elements generates from the plurality of mixer output signals a plurality of simultaneous beams where each beam of the plurality of simultaneous beams is associated with one of a plurality of carrier frequencies, where the plurality of simultaneous beams are subject to design constraints that control a bearing-target doppler ambiguity, a uniform response in bearing, out-of-band spectra leakage interference, peak power level, and cross-beam reverberation upon receive.

According to a further embodiment of the disclosure, the spatial array of transducer elements includes 3-rectangular elements that generate simultaneous endosteal and periosteal bone healing beam patterns, wherein each rectangular element measures 25 mm×3.4 mm with an inter-element spacing of 3.5 mm.

According to a further embodiment of the disclosure, the system includes a set of bandpass filters, wherein each bandpass filter of the plurality of bandpass filters receives one of the plurality of mixer output signals and filters one of a sum-frequency side lobe or a difference frequency side lobe from the one of the plurality of mixer output signals.

DETAILED DESCRIPTION

Figure 1:
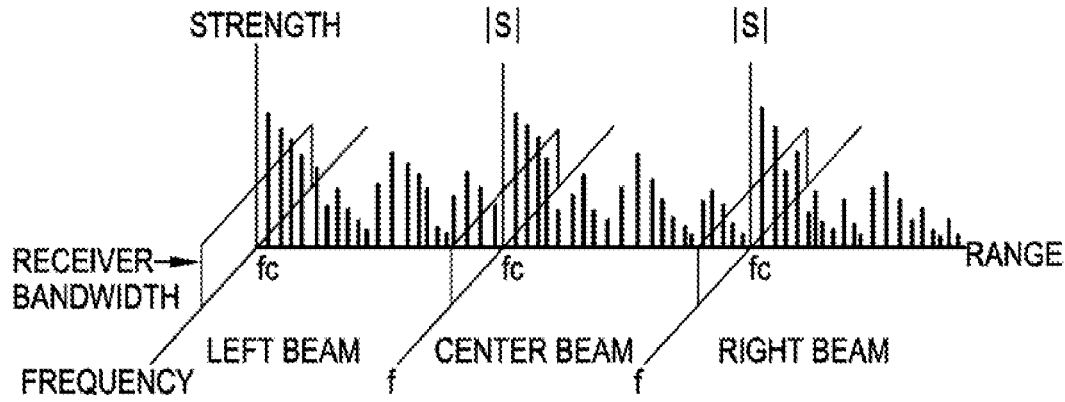
FIGS. 1A-B depict TMA principles in reducing cross-beam reverberation for multiple beam transmissions, according to an embodiment of the disclosure.
Figure 1:
Figure 1:
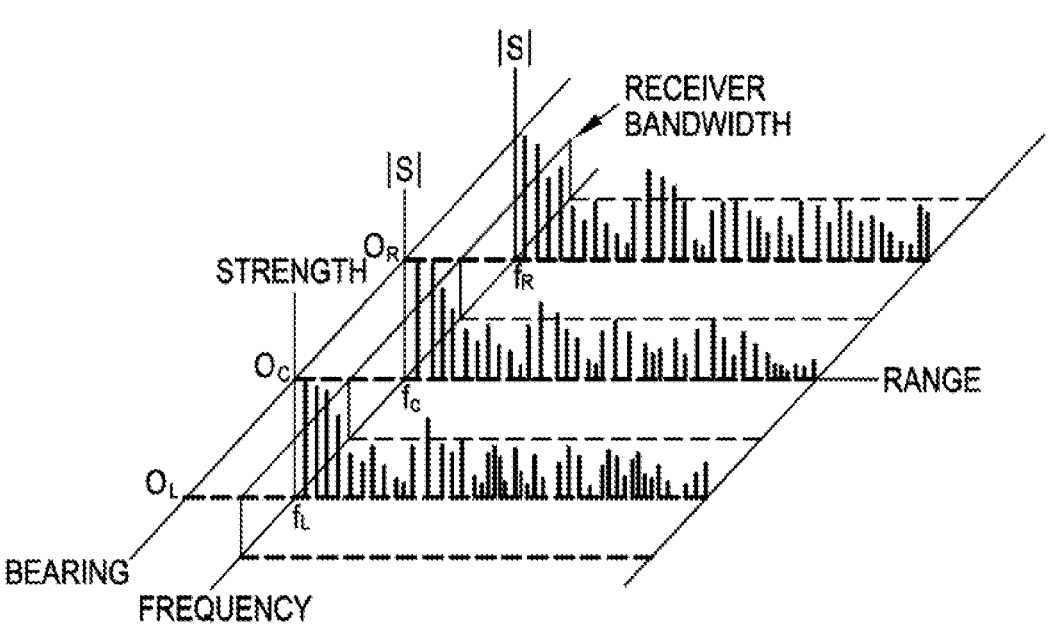

Embodiments of the disclosure are directed to a unique acoustic space-frequency diversity system that includes a time modulated array that generates a spatial distribution of transmitting frequencies that permit simultaneous multiple beam steering, where each beam is associated with a different carrier frequency. Each transmit beam can be steered to a different spatial direction in either the vertical or horizontal plane for maximum acoustic coverage and signal-to-masking ratio. The multiple transmitted frequencies can be received with a single omnidirectional piezoelectric hydrophone whose output is processed with a high-resolution fast Fourier transform (FFT) receiver, where each spectral component corresponds to a unique spatial bearing. Thus, by coding the spatial acoustic field in frequency, the receiver architecture complexity is minimized and most of the cross-beam clutter or reverberation masking level in the receiver display output can be significantly reduced.

FIGS. 1A-B depict the basic principles behind the effectiveness of TMA transmissions for reducing the coherence of reverberation in multi-beam echoes, utilizing a common method for scanning called rotational directional transmission (RDT). RDT sequentially transmits a beam in a circular pattern at a constant frequency and narrow bandwidth, producing a coherent summation (i.e., a linear summation on the basis of amplitude) of reverberation in any one of the receive beams due to (1) the product of the transmit and receive major-lobes and (2) sidelobe interference from adjacent beams in a major lobe. This is shown in FIG. 1A, which shows a left beam, a center beam and a right beam of the same frequencies and phases. In FIGS. 1A-B, the vertical axis represents the signal strength or amplitude, the horizontal axis represents range, and the oblique axis represents frequency, where the bracket indicates the signal bandwidth. TMA operation tends to reduce this to an incoherent summation (i.e., a linear summation on the basis of energy), often referred to as spatial decoupling, by employing a separate frequency for each beam and spreading the set of transmit frequencies over a larger bandwidth. In addition, the spatial distribution of the transmitted frequencies will also tend to reduce the spatial variance of the background fluctuations, thereby improving the false alarm rate. This is shown in FIG. 1B, where the left, center and right beams now have different frequencies.

Embodiments of the disclosure refine the frequency encoding procedure in the TMA beamforming process of operational systems to address the issues given above.

First, the geometry of the linear, convex and planar arrays are presented in a series of signal representations that are clearly defined. Conducting these functional operations results in the general expression for the instantaneous spatial-temporal pressure field producing simultaneous beams as a function of frequency.

Second, in practical TMA operation, the spatial distribution of the beams will depend upon the constraints of finite pulse length, finite array bandwidth, element directivity pattern, and target doppler. These, in turn, will impact on the following engineering and operational considerations:

1. Interbeam interference within the transmitting bandwidth;
2. Bearing-doppler ambiguity; and
3. Spectra leakage interference from outside the passband.

Interbeam interference will result in a nonuniform signal response on the maximum response axes (MRA's) of a preformed beam (PFB) receiver. For efficient detection capability at all bearings, the spatial distribution of the maximum response axis should be (almost) constant, i.e., the separation frequency $(f_s)$ should be sufficiently large so that the sidelobes of each sinc function do not seriously overlap the adjacent sinc function, as expressed in EQ. (6), below.

Bearing-doppler ambiguity is a consideration in those applications characterized by target and/or platform motion. Since normal TMA operation codes the spatial distribution of beams in frequency, if the frequency separation between beams is insufficient, a moving target at a given bearing may produce a doppler shifted echo frequency that lies within the frequency band assigned to an adjacent beam. Although the detection capability of sonar will not be meaningfully affected, the target will appear on the display at an erroneous bearing. This is referred to as a "bearing-doppler ambiguity" and must be eliminated to permit accurate target localization and tracking. Thus, in practice, the harmonic separation will have to be much greater than that indicated above to avoid bearing-doppler ambiguity due to the combined effects of target and sonar platform motion.

For a moving source, target, and receiver, the frequency of the echo pulse ($f_e$) is given by (Horton), $$f_e = f_p[(c-v_t)(c-v_r)]/[(c-v_s)(c-v_t)]$$

where $f_p$ the transmitted frequency at the source, (c) is the velocity of the sound wave moving away from the source, $(c-v_x)$ is the relative velocity of the sound wave removing source, $(c-v_t)$ is the relative velocity of the transmitted pulse at the target, $(c-v_r)$ is the relative velocity of the sound wave reflected from the moving target, and $(c-v_r)$ is the relative velocity of the sound wave at the moving receiver.

The total maximum doppler ($f_D$) incurred is determined by computing the range of ($f_e-f_p$) for the spread of source and receiver speeds and opening and closing target speeds. If it is assumed that $v_t=v_t$, and $v_r=-v_s$, $(v_t, v_r)/c \ll 1$, and c=4920 feet/sec, then the doppler shift $f_D$ is $$f_D = |f_e-f_p|_{max} = 0.7 f_p |v_s-v_t|_{max} \text{ (in Hz)}.$$

Combining previous results, the separation frequency $f_s$ required to eliminate bearing-doppler ambiguity and provide reasonably uniform responses in bearing is $$f_s = f_D + 6T' = 0.7 f_p |v_s-v_t|_{max} + 6/\text{(pulse length)}.$$

Spectra (out-of-band) interference leakage can be reduced to insignificant levels (less than 50 dB re MRA) by judicious selection of the separation or sampling frequency $f_s$ and information frequency $f_o$ and the number of beams, namely, that $$2f \approx (P_c - P_o)f_s$$

where $P_c$ and $P_o$ are integers that denote the last and first harmonics, respectively, $(P_c-P_o)$ is the number of beams, ($f_s$) is determined from the equation above, which includes the spreading due to source, target and receiver speeds.

It has been shown that interbeam interference and bearing-doppler ambiguity can be eliminated by increasing the sampling sufficiently to cover the total doppler spread, including both platform and target. However, for a given piezoceramic element design, as the sampling frequency increases, the number of allowable frequency diversity beams decreases. Also, the information frequency $f_o$ must increase in accordance with the equation above, to avoid out-of-band leakage interference.

Third, the transmit source level ($SL_{LIN}$) on a maximum response axis (MRA) for a linear array with N elements with constant input electrical power will be reduced by the number of frequency coded beams, so that the transmit source level for the TMA is $$SL_{TMA} = SL_{LIN} - 10 \log M = [7.16 + 10 \log P_e N + 10 \log E_{ff} + DI] - 10 \log M$$

where the reference (for sonar operation) is to 1 microbar at a distance of 1 yard from the face of the transducer element, ($P_e$) is the electrical power input per element, ($E_{ff}$) is the transmitting frequency, (DI) is the directivity index of the transducer array, (M) is the number of beams formed, and each element contributes to the source level simultaneously. In an embodiment, SL=20 log rms pressure on the MRA.

It is important to see how the number of beams impacts on the peak power rating of the power amplifier. For the case of M harmonics of peak amplitude (A), when the tonals are in phase and add coherently, the peak amplitude will be (MA) at the fundamental period (1/$f_s$). This implies that if the rms power per tonal required to give a specified source level is $P_{rms}$, then the total peak power required for (M) tonals is (2$M^2 P_{rms}$). The design complexity and cost of the power amplifiers will increase with the number of tonals or TMA beams, i.e., whether it is a narrowband or wideband system.

Formulation of Linear TMA

According to an embodiment, simultaneous multiple beam frequency steering can be obtained by producing controlled frequency-varying phase shifts between adjacent transducer elements. A basic TMA acoustic system depicting the technique for a general array, in broad terms, can be considered to be comprised of the signal generator, which is an informational signal, the TMA beamformer, which includes a pulsed sampling signal, a tapped delay line, mixers, bandpass filters, and complex weightings, a power amplifier, considered normalized to 1 watt, and a transducer array.

Figure 2:
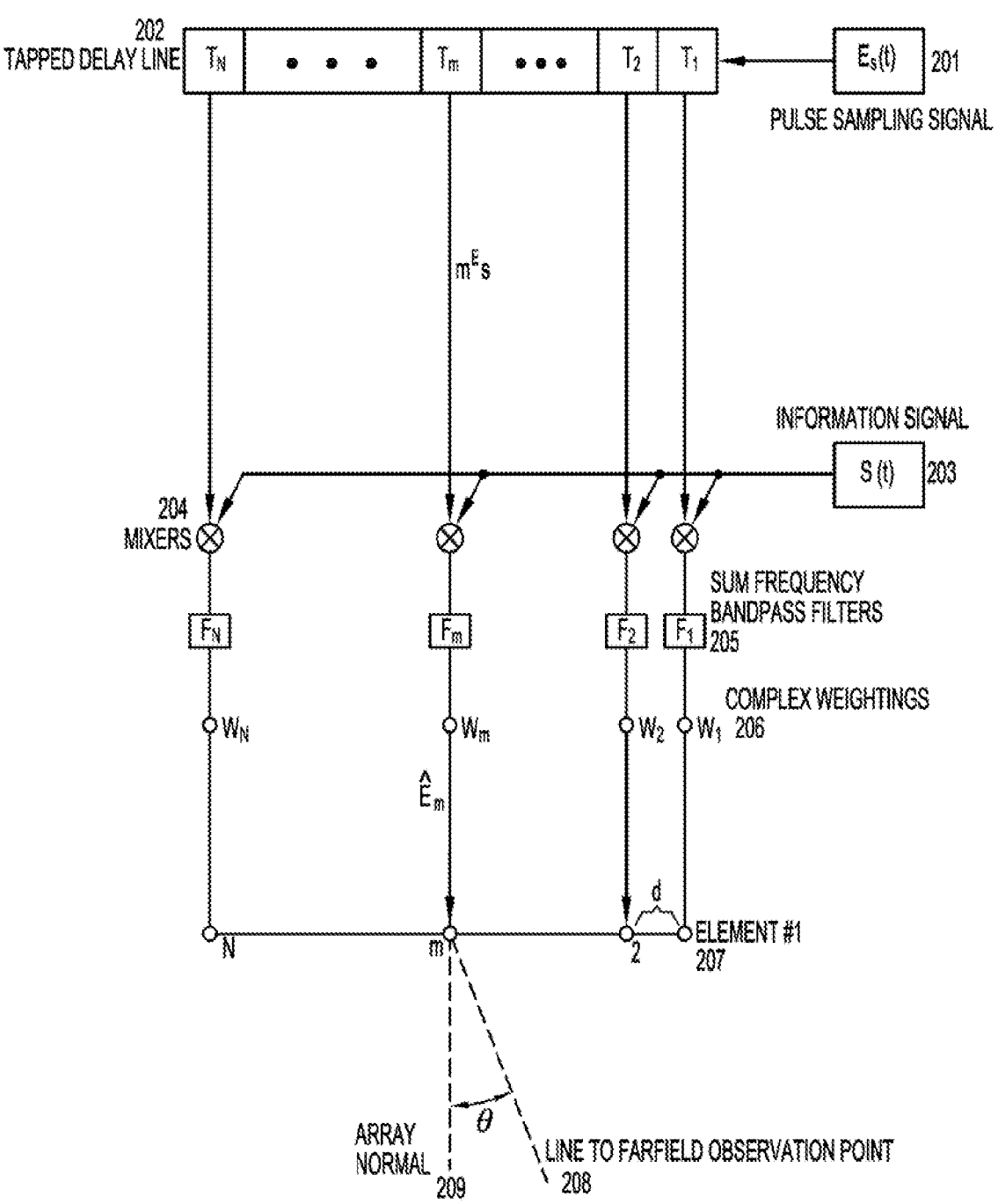
FIG. 2 depicts an exemplary TMA configuration comprised of a linear array of N-equi-spaced elements, according to an embodiment of the disclosure.

For a linear array, the formulation of a instantaneous pressure field p($\theta$, t) is based on FIG. 2 which depicts an exemplary TMA configuration comprised of a tapped delay line 202 that receives a pulse sampling signal 201, mixers 204 that combine the output of the tapped delay line with an information signal 203, sum frequency bandpass filters 205 and complex weightings 206 that act on the signals output from the mixers 204, and a linear array of N-equi-spaced transducer elements 207 with inter-element spacing d. Each element of this array 207 is fed from a tap on the delay line 202 which is excited by a series of frequency harmonics 201. According to embodiments, the transducer elements 207 map include power amplifiers. The requirement for simultaneous multiple beam frequency steering can be reduced to one of producing controlled frequency-varying phase shifts between adjacent transducer elements. The resulting pattern generated by this array consists of a set of distinct beams of different frequencies, pointing in different directions. The transmitting acoustic frequency and beam steering angle for each beam are uniquely determined by the harmonic number with the zeroth harmonic producing a beam whose maximum response axis (MRA) is perpendicular to the array. The linear TMA is analyzed as follows. According to embodiments, the tapped delay line 202, the mixers 204, bandpass filters 205 and complex weightings 206, along with the pulse sampling signal 201 and the information signal 203 make up the beam forming apparatus.

Referring to FIG. 2, according to an embodiment, the harmonic generation function or pulse sampling signal $E_s(t)$ 201 is a finite Fourier series input to the tapped delay line 202 and is represented as $$E_s(t) = \Sigma_{P_0}^{P_c} a_p \exp(j2\pi(f_r + pf_s)t) \quad (1)$$

where $j=\sqrt{-1}$, ($f_r$) is a reference frequency, ($f_s$) is the fundamental harmonic or separation frequency, and $P_o$ and $P_c$ are integers denoting the first and last harmonics, respectively. The weighting coefficients, $a_p$, are included for generality. The fundamental frequency is chosen to satisfy the requirements of total doppler spread, including target and platform motion, and the effects of finite signal pulse length. The reference frequency is chosen to facilitate subsequent filtering operations. The total number of harmonics is ($P_c - P_o + 1$). If the time is referenced to tap m+1, the sampling signal output by the mth-tap is given by $$_m E_s(t) = \Sigma_{P_0}^{P_c} a_p \exp(j2\pi(f_r + pf_s)(t-m\tau)) \quad (2)$$

where ($\tau$) is the delay between successive taps. Each $E_s(t)$ is then mixed or time-modulated by a mixer 204 with a time-limited information signal, s(t) 203, of the form $$s(t) = p_T(t)\cos(2\pi f_o t), \quad (3)$$

where $f_o$ is the transmit frequency $p_T(t)$ is a rectangular envelope of pulse length 2T defined by:

$$p_T(t) = \begin{cases} 1 & \text{if } 0 \le t \le 2T \\ 0 & \text{otherwise} \end{cases},$$

whose Fourier transform $\mathscr{F}$ is $$\mathscr{F} = \frac{\sin(2\pi f T)}{\pi f} \exp(-j 2\pi f T). \tag{4}$$

The output of the mth-mixer is $$E_m(t) = p_T(t) \cos(2\pi f_o t)_m E_s(t) = \tag{5}$$

$$\frac{1}{2} p_T(t) \sum_{P_0}^{P_c} a_P \{ \exp(j 2\pi((f_r + f_0 + pf_s)t - m(f_r + pf_s)\tau) +$$

$$\exp(j 2\pi((f_r - f_0 + pf_s)t) - m(f_r + pf_s)\tau) \}.$$

Taking the Fourier transform of $E_m(t)$, the sum and difference spectra are $$E_m(f) = \sum_{P_0}^{P_c} a_p \exp(-j 2\pi(m(f_r + pf_s)\tau - (f_r + pf_s)T)) \times \tag{6}$$

$$\left\{ \frac{\sin(2\pi[f - (f_r + f_0 + pf_s)]T)}{[f - (f_r + f_0 + pf_s)]T} + \frac{\sin(2\pi[f + (f_r + f_0 + pf_s)]T)}{[f + (f_r + f_0 + pf_s)]T} \right\}.$$

It may be seen that the effect of a finite pulse length is to introduce a sin(x)/x (sinc function) amplitude distribution for each harmonic. Considering transmitting in the sum-frequency band, the lobes of the first sin(x)/x term in the curly brackets establish the degree of interbeam interference. The lobes of the second term reflect the spectra leakage interference from outside the passband. By applying the condition, $2f_o > (P_c + P_o)f_s$, spectra leakage will be minimal.

After filtering by bandpass filters 205, which filter one of the lobes in the curly bracket term of EQ. (6), the resultant signal waveform may be weighted by the shading coefficient $W_m$ 206 prior to driving the mth-array element and is given by $$\hat{E}_m(t) \approx W_m p_T(t) \Sigma_p a_p \{ \exp(j 2\pi[(f_r + \epsilon f_0 + pf_s)t - m(f_r + pf_s)\tau]) \}, \tag{7}$$

where the index $\epsilon$ is +1 or −1 depending on whether the sum or difference frequency band, respectively, is retained. Note that the weighting by the complex shading coefficient $W_m$ 206 is optional and can be eliminated in other embodiments. Exemplary, non-limiting complex shading coefficients have unit magnitude and 0 phase. The approximation is due to the time-limited nature of the information signal. In the monochromatic case, $T \to \infty$, and the approximation can be replaced by an equality. EQ. (7) may be further simplified by letting $(f_r \tau)$ be an integral number of cycles, i.e., $f_r \tau = q$, where q is any integer and assuming $T \to \infty$, $$\hat{E}_m(t) = W_m \Sigma_p a_p \{ \exp(j 2\pi[(f_r + \epsilon f_0 + pf_s)t - mpf_s \tau]) \}. \tag{8}$$

Continuing with FIG. 2, as a result of mixing the pulse sampling signal with the finite sinusoidal pulse at the signal generator output, sum and difference frequencies are produced at the mixer output. When the difference frequencies are filtered by the bandpass filters 205, the output of the bandpass filter 205 is quite similar in structure to the pulse sampling signal, but with several distinct differences. First, the carrier frequency of the zeroth harmonic is $(f_r + f_o)$ instead of $(f_r)$. Second, the signal is attenuated at the leading and trailing edges. This is attributed to employing an ideal rectangular bandpass filter which corresponds to convolving the mixer output with a sin(x)/x impulse response. Only a part of the sinc function overlaps the signal at the leading and trailing edges during the convolution process, thus resulting in an attenuation of the signal at these points.

The attenuation will be less with more realizable filter characteristics. In actuality, the signal does not end abruptly at t=2T, but continues to decay, eventually reaching a steady-state of zero amplitude. With the property of reciprocity between conjugate Fourier domains, a broadband filter will produce a more rapid decay than a narrowband filter. Finally, a primary difference is clearly shown by comparing EQS. (1) and (8): each spectral component has a phase slope defined by the harmonic number. It will be shown below that when $\hat{E}_m(t)$ is applied to a TMA planar array of spatial elements, every harmonic number—and thus, each spectral component—corresponds to a particular beam steering angle.

If each signal $\hat{E}_m(t)$ is applied to the mth-transducer element of the linear array 207, the time-varying sound pressure at an arbitrary point in the far-field is the vector sum of the signals $\{\hat{E}_m(t)\}$, considering relative propagation time delays. The far-field TMA sound pressure $p(\theta, t)$ in the direction $\theta$, where $\theta$ is the angle of the line to the far-field observation point 208 with respect to an array normal 209, may then be expressed as $$p(\theta, t) = \Sigma_m \hat{E}(t - m\tau), \tag{9}$$

referred to the m=1 element where $\tau = -d\sin(\theta)/c$ and c is the velocity of sound.

Carrying out the summation utilizing EQ. (8), the output of the linear multi-element transducer array 207 is $$p(\theta, t) \sum_p a_p \sum_m W_m \bigg\{ \exp \tag{10}$$

$$\bigg( j 2\pi m \bigg[ \frac{(f_r + \epsilon f_0 + pf_s)d\sin(\theta)}{c} - \frac{p}{N} \bigg] \bigg) \times \exp(j 2\pi(f_r + \epsilon f_0 + pf_s)t) \bigg\},$$

where it can be seen that each beam in the summation is associated with one of the carrier frequencies.

To improve the visualization and understanding of the TMA process, the above derivation of the beam pattern distribution expressed in EQ. (10) assumes a long signal pulse length to approximate the monochromatic case and negligible spectra leakage.

For an information signal s(t) with complex Fourier spectrum S(f), the far-field time-varying pressure for a monochromatic signal given in equation (10) is weighted by the spectrum to give:

$$p(\theta, t) = \sum_p a_p \tag{11}$$

$$\int df' S(f') \bigg\{ \sum_m W_m \bigg\{ \exp \bigg( j 2\pi m \bigg[ \frac{(f' + f_r + \epsilon f_0 + pf_s)d\sin(\theta)}{c} - \frac{p}{N} \bigg] \bigg) \bigg\} \times$$

$$\exp(j 2\pi(f' + f_r + \epsilon f_0 + pf_s)t) \bigg\},$$

where the total delay time $N\tau$ is chosen to be equal to the sampling period, $N\tau = 1/f_s$.

In a variation of the linear array according to an embodiment, the TMA beamformer for the linear array of N-equi-spaced transducer elements depicted in FIG. 2 can utilize the nonlinear properties of the acoustic medium by transmitting at higher power, sufficient to produce finite-amplitude waves in the far-field. This is further discussed below in for the section "Underwater Mining and Communications".

TMA Beam Steering Constraints

The sum of EQ. (10) may be recognized as the beam pattern for a linear array of frequency $(f_r + \epsilon f_o + p f_s)$ pointing in the direction $$\theta_p = \sin^{-1}[2\pi p f_s \tau]/(k_p d)] \tag{12}$$

where $\theta_p$ is a pointing angle, which is a direction of maximum response for a particular beam associated with a harmonic number, $(k_p)$ is the harmonic dependent wave-number, $$k_p = 2\pi/\lambda_p = 2\pi(f_r + \epsilon f_o + p f_s)/c. \tag{13}$$

By choosing the total delay time equal to the sampling period, $N\tau = 1/f_s$, the pointing angle $\theta_p$ is a function of the harmonic parameters (p) and $(f_s)$, the center frequency $(f_r + \epsilon f_o)$, and the array parameters (N) and (d); EQ. (12) simplifies to $$\theta_p = \sin^{-1}[2\pi p/(Nk_p d)]. \tag{14}$$

For a given array geometry and fixed values of $(f_r, f_o, f_s)$, the range of (p) allowable in a TMA design according to an embodiment are those which satisfy the inequality, $$[2\pi p/(Nk_p d)]_{abs} \leq 1. \tag{15}$$

According to an embodiment, the number of acceptable beams determines the spatial coverage and the required bandwidth of the transmitting system. Due to practical constraints of transducer bandwidth and the operational requirement that the harmonic beams have uniform beamwidth and sidelobe structure, the number of harmonics is TMA beamforming will be less than that permitted by EQ. (15).

EQ. (15) expresses how the acoustic (or E/M) system parameters define the directions to which the beams are simultaneously steered. As the number of elements or element spacing increases, the MRAs of the harmonic beams will move closer to one another. For a fixed element spacing, increasing the center frequency (zeroth harmonic) will result in a narrower 3 dB beamwidth. This implies that as the separation frequency increases, the beamwidths will become narrower for positive harmonics and wider for negative harmonics, the latter accompanied with steering angles that diverge more widely from the zeroth harmonic. For separation frequencies much smaller than the center frequency, the harmonic wave-number will be practically constant, producing a symmetric distribution. If $[2\pi p/(Nk_p d)]_{abs} \ll 1$, then the beam steering angles will be multiples of $[2\pi p/(Nk_p d)]_{abs}$. If it is desired to steer a particular harmonic in a given direction, say $\theta_p^*$, it can be done by defining the delay time $\tau_p^*$ such that $$\tau_p^* = k_p d \sin \theta_p^*/(2\pi p f_s). \tag{16}$$

Formulation of TMA Convex Array

Figure 3:
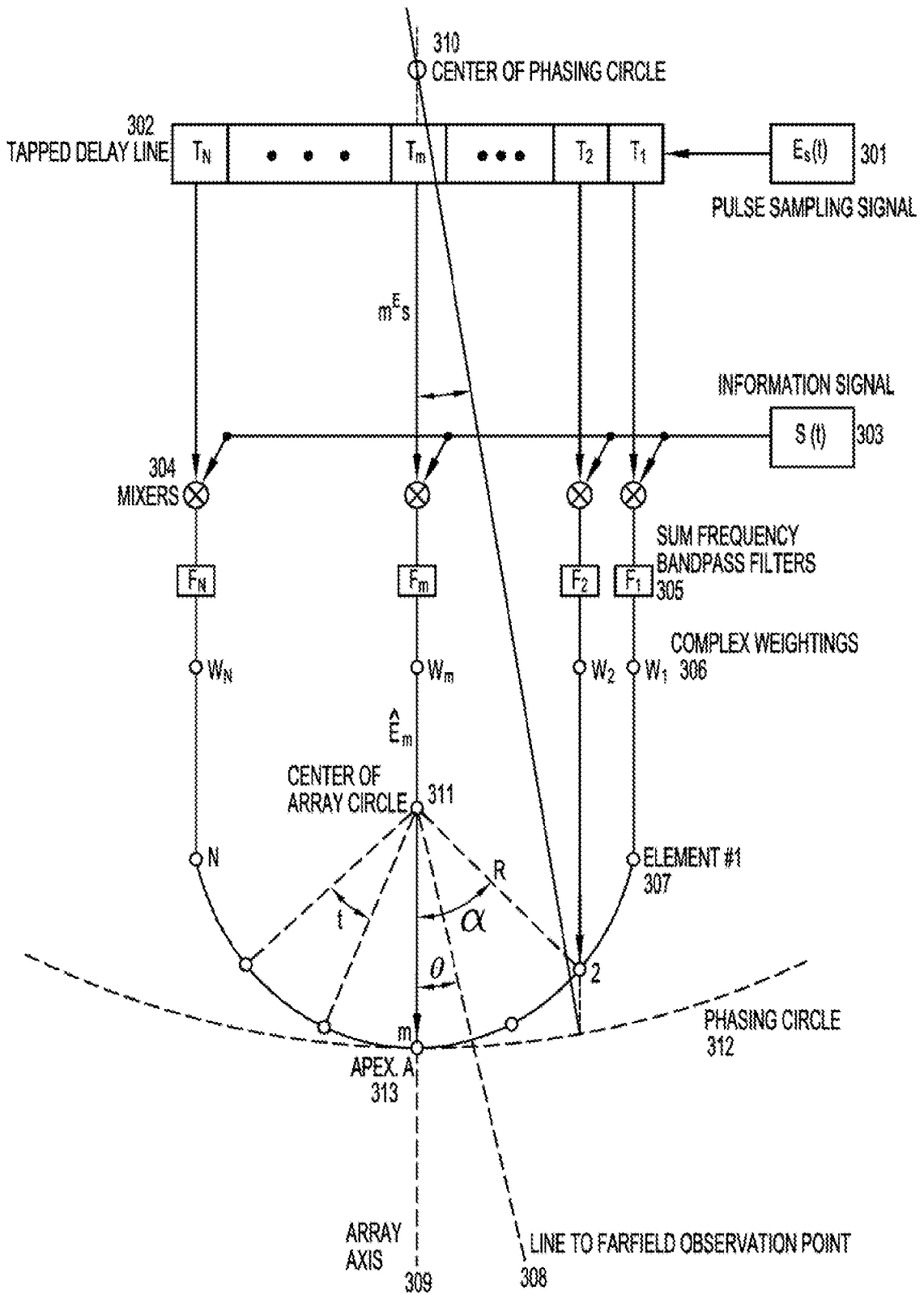
FIG. 3 depicts an exemplary TMA configuration comprised of a circular array of N-equi-spaced elements, according to an embodiment of the disclosure.

FIG. 3 depicts an exemplary TMA configuration comprised of a circular array of N-equi-spaced elements, according to an embodiment of the disclosure. In FIG. 3, elements that are similar to those in FIG. 2 have similar reference numbers. FIG. 3 differs from FIG. 2 in that the linear array of transducer elements 207 is replaced by a circular array of transducer elements 307 of radius (R) to the array center 311, where an angular separation of each transducer element is $(\varsigma)$. According to an embodiment, the complications introduced by arranging the transducer elements in a circular arc are geometrical; all other aspects of the TMA principle are the same as before. In an analysis, all times to the far-field points are referenced to a line through the apex of the circular sector which is perpendicular to the symmetry axis or the line bisecting the sector angle, as indicated in FIG. 3. The TMA pattern for a N-point convex array in the far-field may consequently be written for an arbitrary signal with spectrum S(f) as $$p(\theta, t) = \sum_p a_p \int df' S(f') \left\{ \sum_m W_m \right. \tag{17}$$

$$\left. \left\{ \exp\left(-j2\pi\left[(f_p(R/c)(\cos(\theta - m\varsigma) - \cos(\theta) + pm/N)\right])\right] \right\} \times \exp(j2\pi f_p t), \right.$$

where $f_p = (f' + f_r + \epsilon f_o + p f_s)$. The term in the square brackets is the conventional beam pattern steered to a direction defined by the harmonic number of the sampling signal. Note that the direction of each component beam cannot be determined directly, since the quantity in the exponent is not in general zero for all (m) when $(\theta)$ corresponds to the MRA of a particular beam. Also, each harmonic represents a beam smeared out slightly due to the finite bandwidth of the signal s(t). As for linear arrays, this, as well as interbeam interference, is minimized for signals having long pulse lengths.

According to an embodiment, additional phase weightings can be introduced to phase each element back-to-a-line or to a circular arc. This will act as a spatial filter to maximize the signal-to-noise ratio. Let this phasing circle 312 pass through the apex, A 313 of the circular transducer array 307, and be perpendicular to the symmetry axis. The phase weighting will be:

$$\exp[-j2\pi(f_p/c)[R(1-\cos\alpha)-\rho(1-\cos\beta)], \tag{18}$$

where $(\alpha)$ is the angular location of the mth-element with respect to the symmetry axis, $(\rho)$ is the radius of the phasing circle, and $\beta = \sin^{-1}(R/\rho)\sin\alpha$. Note that $(\rho) \gg (R)$, the radius of the circular transducer array, so that the center 310 of the phasing circle is behind the tapped delay line 302. The circular TMA formulation is completely characterized by EQS. (17) and (18).

Formulation of TMA Planar Array

Figure 4:
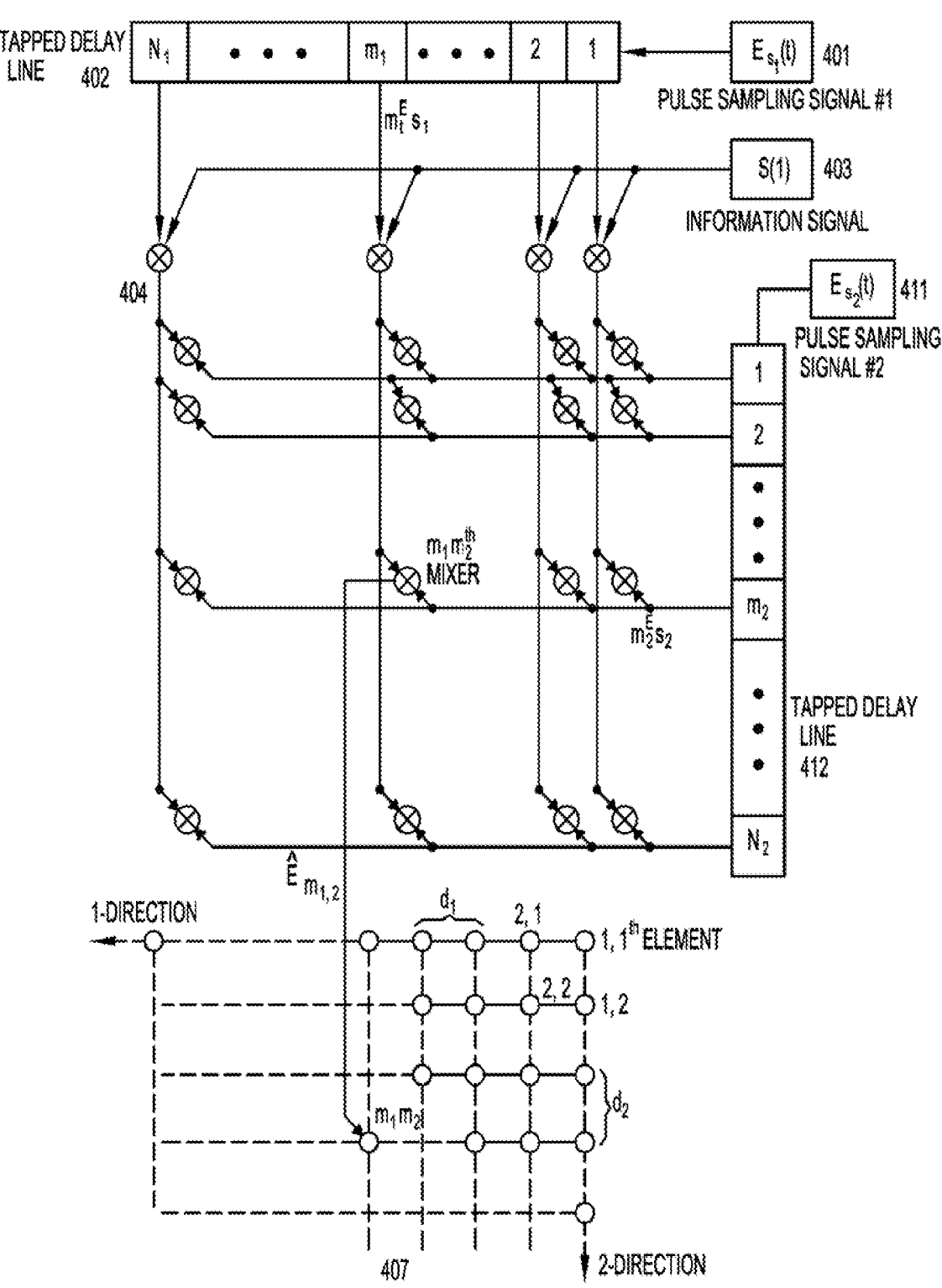
FIG. 4 depicts an exemplary TMA configuration comprised of a planar array of $N_1N_2$-equi-spaced elements, according to an embodiment of the disclosure.

FIG. 4 depicts an exemplary TMA configuration comprised of a planar array of $N_1 \times N_2$ spaced elements, according to an embodiment of the disclosure. In FIG. 4, elements that are similar to those in FIG. 2 have similar reference numbers. FIG. 4 depicts of a first tapped delay line 402 that receives a first pulse sampling signal 401, a second tapped delay line 412 that receives a second pulse sampling signal 411, mixers 404 that combine the outputs of the first and second tapped delay lines with an information signal 403, and a planar array 407 of $N_1$ elements with spacing $d_1$ in a first direction D1, and $N_2$ elements with spacing $d_2$ in a second direction D2. For convenience of illustration, the sum frequency bandpass filters and complex weightings are not shown. A transmission process includes two distinct linear modulation excitations, each applied simultaneously along one of the directions of the array, thereby providing a three-dimensional fan of beams coded with different frequencies. The TMA planar array system is briefly analyzed as follows.

Following the method of analyzing the linear array, the pulse sampling signal $E_s(t)$ is again a finite harmonic series input to the tapped delay line, similar to that in EQ. (1), $$E_{s_{1,2}}(t)=\Sigma_{P_0}{}^{Pc}a_{p_{1,2}}\exp(j2\pi(f_{r_{1,2}}+p_{1,2}f_{s_{1,2}})t), \tag{19}$$

where the subscripts 1, 2 refer to either the first or second tapped delay line, and the output at the $m_1$-tap in the D1 direction is;

$$m_1 E_{s_1}(t)=\exp(j2\pi f_{r_1}t)\Sigma_{P_0}{}^{Pc}a_{p_1}\exp(j2\pi p_1(f_{s_1}t-(m_1-1)/N_1)). \tag{20}$$

For an information signal 303 of the form s(t)=2u(t)cos $\omega_o$t, where u(t) is the low-frequency amplitude modulation, the complex Fourier spectrum can be expressed as S($\omega'$)=U($\omega'+\omega_o$)+U($\omega'-\omega_o$). Therefore, the output of the $m_1$-mixer is $$E_{m_1}(t) = \frac{1}{2\pi}\int U(\omega' - \epsilon_1\omega_0)\exp \tag{21}$$
$$\left(j(\omega' + \omega_{r_1})t\right)d\omega'\sum_{P_0}{}^{P_c}a_{p_1}\exp\left(j2\pi p_1(f_{s_1}t - (m_1 - 1)/N_1)\right),$$

where the index, $\epsilon_1$, is +1 or −1 depending on whether the sum or difference frequency, respectively, is retained by the bandpass filter. The $m_1$-mixer output, $\hat{E}_{m_1}(t)$, is multiplied by the sampling signal at the $m_1$-tap, which is similar to the excitation in EQ. (21), and is given by:

$$m_2 E_{s_2}(t)=\exp(j2\pi f_{r_2}t)\Sigma_{P_0}{}^{Pc}a_{p_2}\exp(j2\pi p_2(f_{s_2}t-(m_2-1)/N_2)). \tag{22}$$

The resultant signal is filtered again prior to driving the $m_{1,2}$ array element, and is designated $E'_{m_{12}}(t)$.

If each signal $E'_{m_{12}}(t)$ is applied to the $m_{1,2}$-transducer element of the planar array 407, the time-varying sound pressure established in the far-field is the vector sum of the signals $\{E'_{m_{12}}(t)\}$, considering relative propagation time delays (re elements $m_1$, $m_2$=1). The far-field TMA sound pressure for the TMA planar array 407 may consequently be written as $$p(\alpha, \beta, t) = \frac{1}{2\pi}\sum_{P_1,P_2}a_{p_1}a_{p_2} \tag{23}$$
$$\int d\omega' U(\omega' - \epsilon_1\omega_0)\left\{\exp\left(j(m_1 - 1)\left[\frac{\omega_{12}d_1\cos(\alpha)}{c} - \frac{2\pi p_1}{N_1}\right]\right)\right\} \times$$
$$\left\{\exp\left(j(m_2 - 1)\left[\frac{\omega_{12}d_2\cos(\beta)}{c} - \frac{2\pi p_2}{N_2}\right]\right)\right\}$$

where $\alpha$ and $\beta$ are the direction cosines of the far-field observation point with respect to the 1-direction and 2-direction, respectively, and $\omega_{12}=\omega_{r_2}+\omega'+\epsilon_2\omega_{r_2}+p_1\omega_{s_1}+p_2\omega_{s_2}$ is the frequency of the pipe-harmonic. The terms in the brackets are the conventional beam patterns, each steered to a direction defined by the harmonic number of the associated sampling signal. The direction cosines of the individual beam MRA's are defined in EQ. (24):

$$\cos\alpha=(2\pi p_1/N_1)(c/d_1\omega_{12}),$$
$$\cos\beta=(2\pi p_2/N_2)(c/d_2\omega_{12}). \tag{24}$$

Each harmonic represents a beam smeared out slightly due to the finite bandwidth of s(t). This, as well as interbeam interference, is minimized for signals having long pulse lengths.

TMA Receivers

The linear, convex, and planar TMAs described above require a special receiver to process the echo returns. This is because space has now been coded into frequency and thus requires a fine-frequency detection and tracking receiver.

Figure 5:
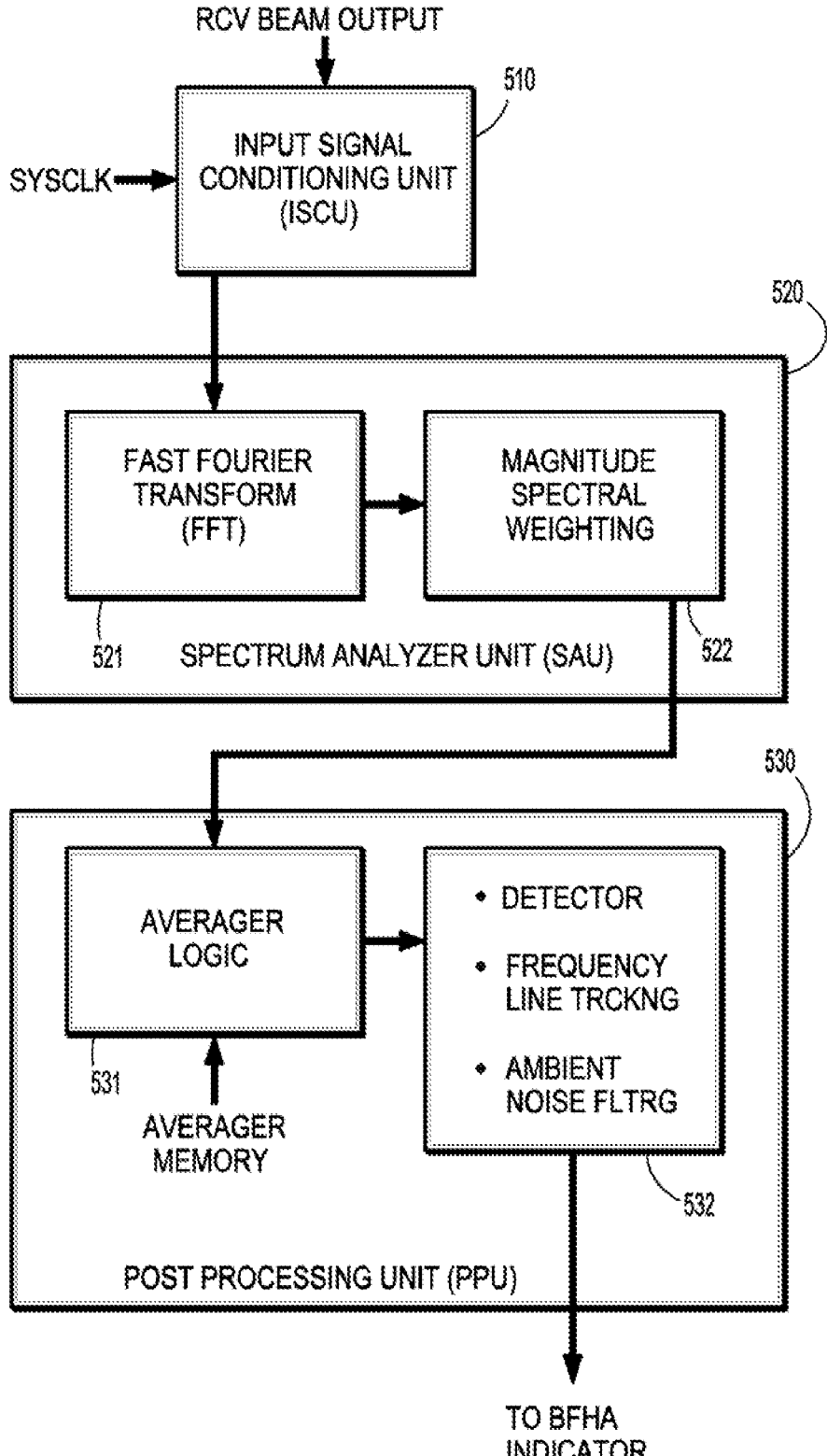
FIG. 5 is a functional block diagram of a receiver for a TMA processor analyzer with omni receive beam output driving a multi-spectral line FFT receiver, according to an embodiment of the disclosure.

FIG. 5 is a functional block diagram of a receiver TMA processor analyzer, implemented as a passive detector with a probability of detection (PD) above 90% and false alarm rate (FAR) below one per day. The TMA echo signatures, which is the RCV Beam Output, are processed by three contiguous modules: an input signal conditioning unit (ISCU) 510, a spectrum analyzer unit (SAU) 520, and a post Processing Unit (PPU) 530. The ISCU 510 is controlled by a system clock signal SYSCLK. The SAU 520 includes a spectrum analyzer, such an FFT processor 521, a band of tuned bandpass filters or a heterodyne correlator, and a magnitude spectral weighting unit 522 that takes the absolute magnitude of the output of the FFT processor 521. An exemplary post processing unit (PPU) 530 includes a cascade of proven processing technologies. The PPU 530 includes averaging logic and data memory for additional algorithmic processing 531 to enhance the SNR, and a unit 532 that performs automatic spectral line detection and tracking of the bearing-frequency, pattern recognition and ambient noise rejection. As shown, the output of the PPU is then sent to a Bone Fracture Healing Assessment Indicator (BFHAI).

Applications of TMA Technology

There are a number of applications of TMA technology that have not been considered to date (2020), such as medical therapeutic ultrasound, acoustic microscopy, and underwater mining, exploration, and communications.

Bone Growth Stimulation (BGS)

Figure 6:
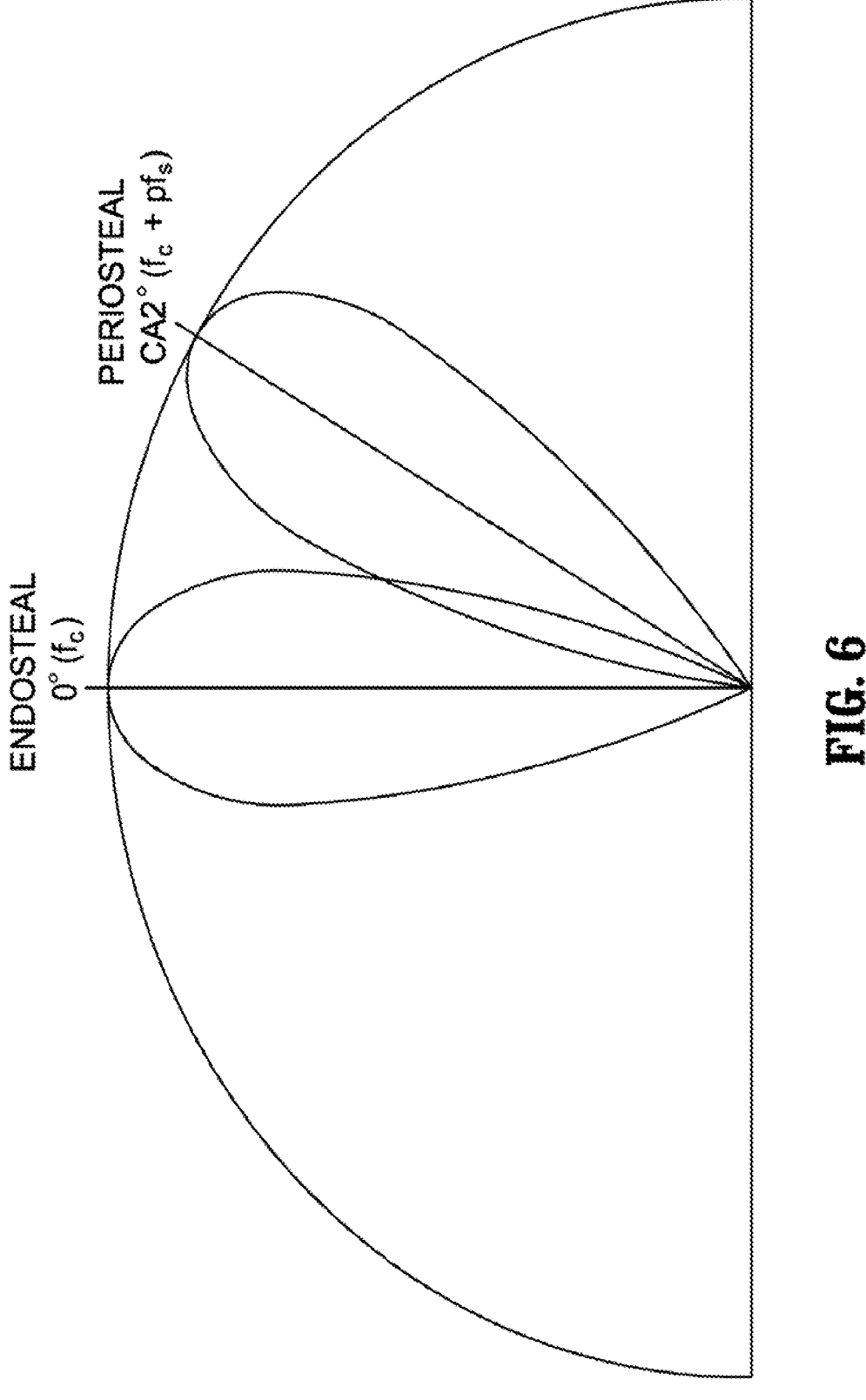
FIG. 6 depicts exemplary BGS TMA transmissions, according to embodiments of the disclosure.

The TMA approach can promote Bone Growth Stimulation (BGS) for simultaneous endosteal and periosteal bone fracture healing which would require two different spatial beams with different steering angles as shown in FIG. 6.

Figure 7A:
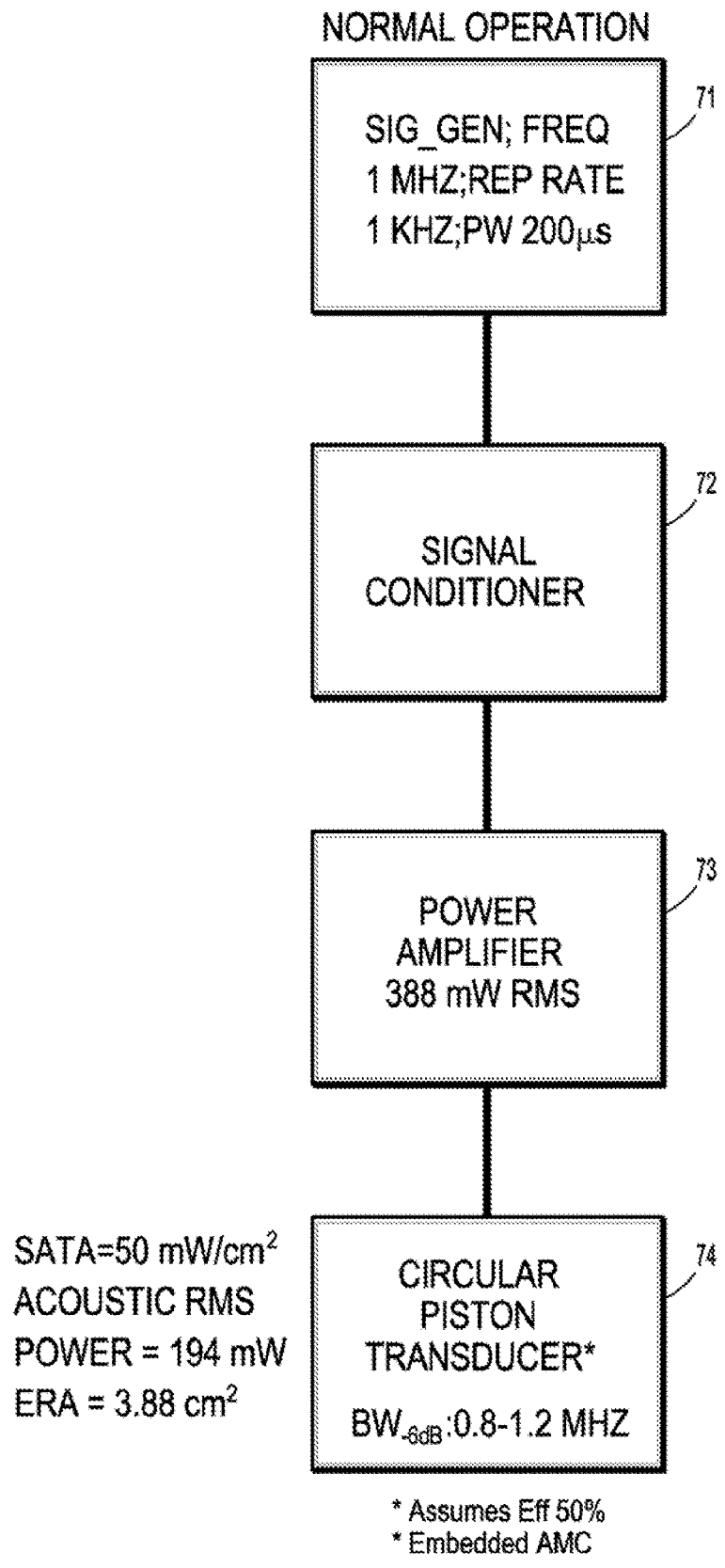
FIG. 7 illustrates BGS configurations for: (A) normal operation; and (B) TMA operation, according to embodiments of the disclosure.
Figure 7B:
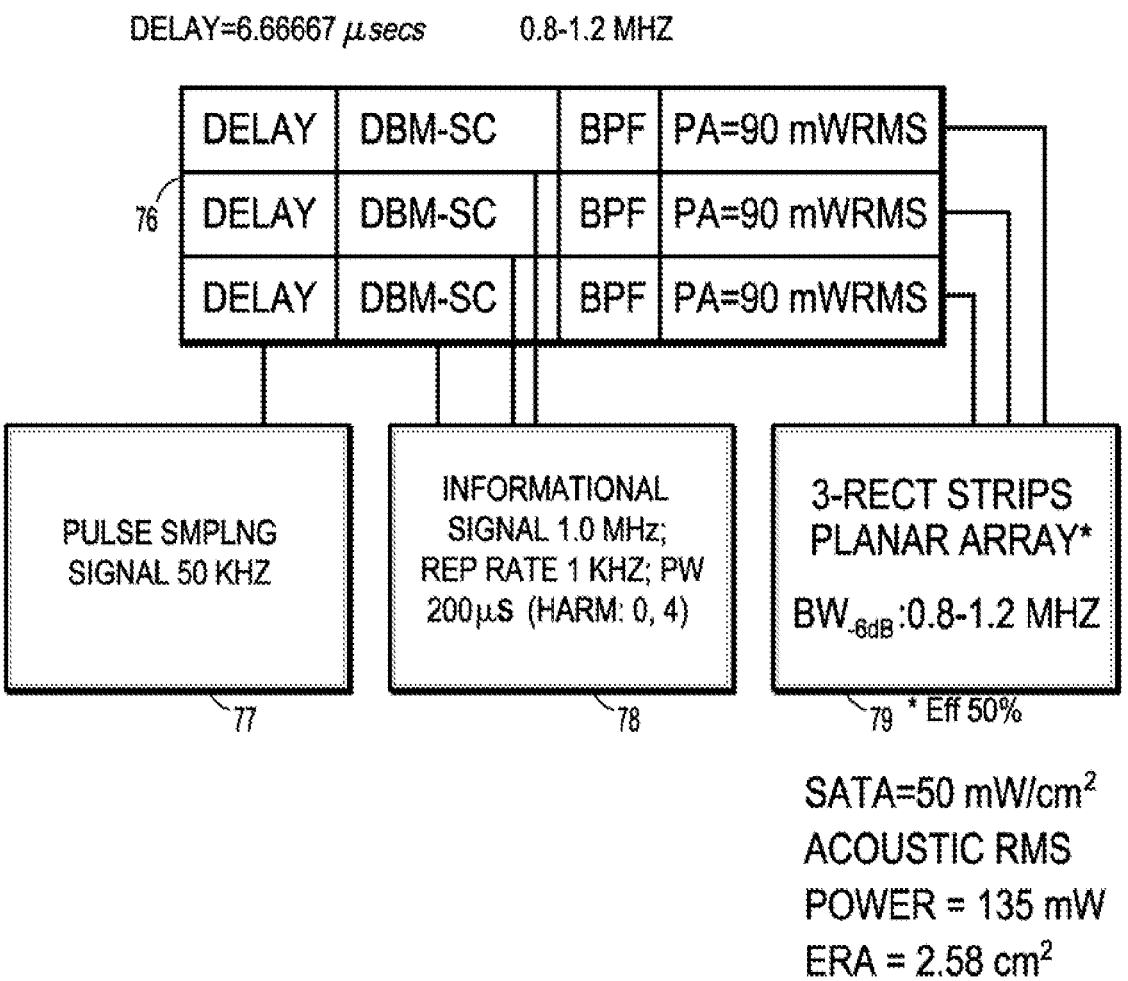

FIGS. 7A-B depict exemplary configurations for BGS where both endosteal and periosteal healing are simultaneously stimulated. This would not require an Acoustic Modal Converter (AMC) but an array comprised of three (3) rectangular strips to form a piston transducer. The power transmitted will be compatible with the beam nonuniformity ratio (BNR), spatial average-temporal average intensity (SATA), effective radiation area (ERA), and transmit frequency of the transducer proposed with the AMC.

FIG. 7A is a block diagram for normal operation and uses a signal generator 71 to produce a low-intensity pulsed ultrasound (LIPUS) signal that includes a transmitting signal of 1 MHZ, a constant envelope, a pulse repetition rate of 1 kHz, a pulse width of 200 μsecs, and a duty cycle of 20%, that is sent to a power amplifier 73 via a signal conditioner 72 that provides an rms output power of 314 mW to a circular piston transducer 74 whose −6 dB bandwidth is about 400 kHz, i.e., from 0.8 to 1.2 MHz, SATA of 50 mW/cm², acoustic rms power of 194 mW, efficiency 50%, with an ERA of 3.14 cm².

FIG. 7B is a block diagram for TMA system operation for the same signal parameters as in FIG. 7A that includes a 3-section TMA module 76 based on the general configuration shown in FIG. 1. Each TMA section of TMA module 76 in FIG. 5B includes a tapped delay line that receives a 50 KHz pulse sampling signal 77, a double-balanced mixer-suppressed carrier (DBM-SC) that combines the output of the delay line with an information signal 78, a bandpass filter (BPF), and a linear power amplifier (LPA) whose output is about 90-100 mW rms, and a transducer element 79. The delay of each step is 6.66667 μsecs. The information signal is 1 MHZ with a repetition rate of 1 KHz and a pulse width of 200 μs. The information signal includes the $0^{th}$ and $4^{th}$ harmonics, but the $1^{st}$, $2^{nd}$ and $3^{rd}$ harmonics have been removed. The output of each delay step drives the RF input of the DBM-SC, where the intermediate frequency (IF) output is band-pass filtered and sent to the LPA. Each of the 3 LPA outputs drives a specific rectangular transducer slat, assuming an efficiency of 50%, that generates two unique acoustic beams simultaneously, one at bearing 0° for endosteal healing and the other at 31.5° for periosteal healing, as shown in FIG. 6. Each beam will have a SATA of about 52 mW/cm$^2$, an acoustic rms power of about 135 mW, and an ERA 2.58 cm$^2$. Note that when the TMA is employed, an absorptive AMC is not required to achieve periosteal healing as in FIG. 7A. Each transducer element measures about 25 mm×3.4 mm, with a separation d of 3.5 mm.

Acoustic Microscopy

A TMA approach according to an embodiment can also be used for a Scanning Acoustic Microscope (SAM). A SAM device can provide unique information about the absorption, elastic properties, and density of tissue cells, which can improve the visualization and clinical assessment of consistent patterns of cellular malignancy.

Acoustical bio-physics estimates a maximum SAM frequency of about 4-5 GHz, producing a wavelength λ of 347 nm. However, an issue with operating at this frequency is that the usual aluminum motor-driven spatial-positional-stepping system is fabricated by an aluminum extrusion process that produces a positional error of about 1 μm (≈1 GHz). A TMA according to an embodiment can eliminate this effect by electronically producing the acoustic beams to cover the desired sector.

Underwater Mining and Communications

A TMA approach according to an embodiment can also be used for underwater communications and oceanographic mining and exploration. Accurate spatial communications in several specific bearings requires minimal sidelobe interference while mining and exploration requires special consideration of beams propagating to mineral beds at different ocean depths and bearings correlating to frequency dependent attenuation. For these applications the term bearing refers to either azimuthal or D/E (depth/elevation).

Figure 8:
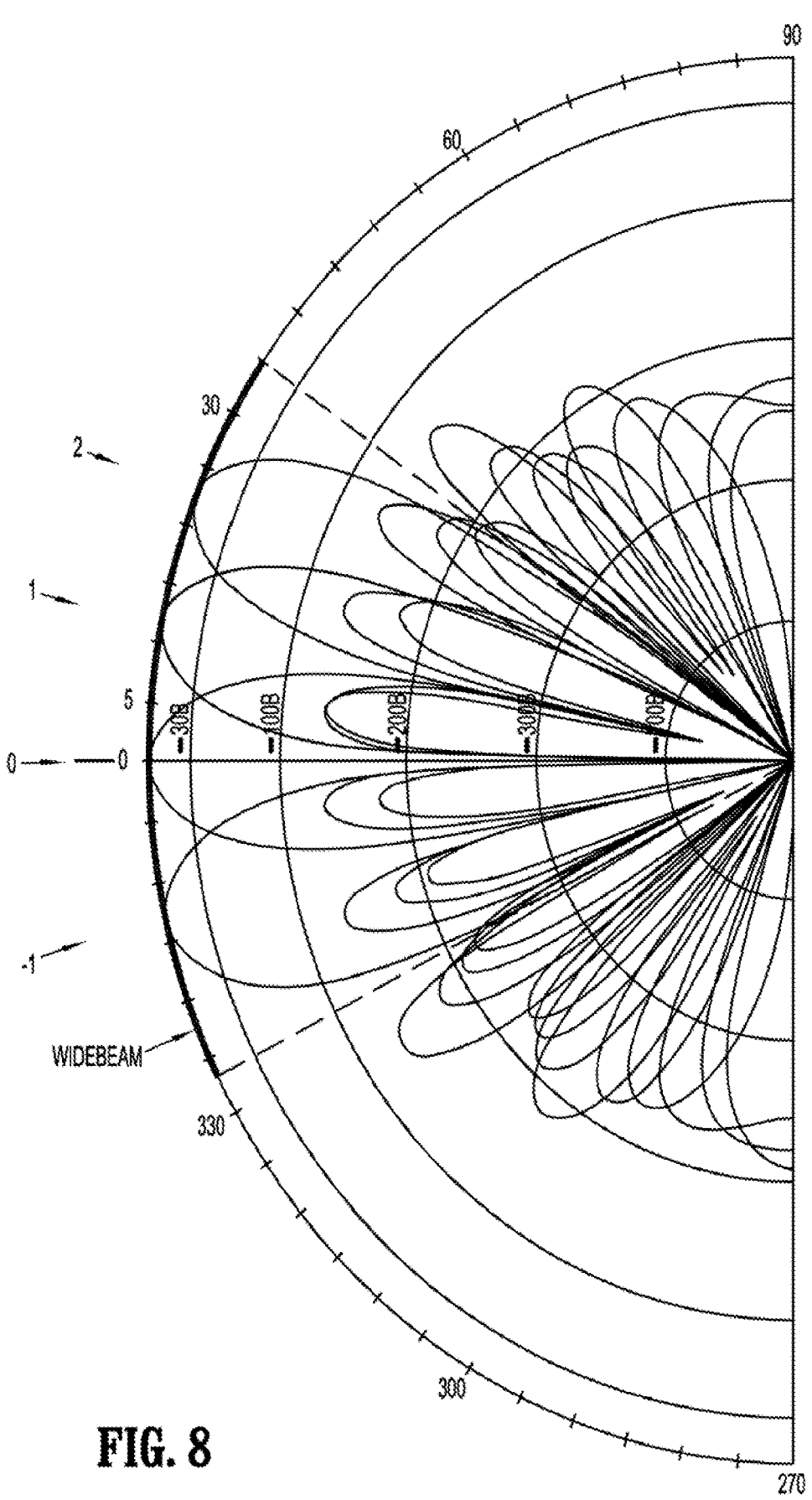
FIG. 8 illustrates the application of TMA principles for underwater sonar operation to generate a parametric array, according to an embodiment of the disclosure.

FIG. 8 depicts two transmit beam configurations. The first uses TMA modulation beamforming technology with a 9-element linear array, such as that shown in FIG. 2, where each element is a square 2.292 inches transducer with an inter-element spacing of 2.4 inches and that produces a complex signal of 4 harmonics (−1, 0, 1, 2) and simultaneously transmits the four beams covering a −3 dB 45° sector (−20° to +25°). This can be hull-mounted in the D/E plane on a surface ship. The transmit frequency at the 0$^{th}$-harmonic is 13 kHz.

The same 9-element linear array may include a second beamformer that utilizes complex element weightings to produce the wide-beam shown in FIG. 8 that covers the 4 narrow TMA beams and matches their peak source level. If the transmit power is sufficiently high, the nonlinear properties of the acoustic medium can be exploited to generate a set of first difference frequencies defined by the frequency of the wide-or-omnidirectional beam, such as $f_{omni}$, minus each of the TMA frequencies $f_{-1}$, $f_0$, $f_1$, $f_2$ shown.

According to an embodiment, for the parametric array in FIG. 8 to maintain a high efficiency in the demodulation process, the frequency down-ratio should be about 3-to-10. In an exemplary embodiment, $f_{omni}$ will be about 15-19.0 kHz. Thus, very low frequency propagating signals, about 4.83 kHz, 4.00 kHz, 3.17 kHz and 2.34 kHz, can be generated with a relatively small high frequency array {TMA: 13.00 kHz; OMNI: 17.00 kHz}. The advantages of an active parametric sonar accrue from a wide bandwidth capability, high angular resolution with reduced sidelobes, and a nearly constant beamwidth over a very wide frequency range. Parametric sonar operational performance is usually better than a conventional linear system due to reduced propagation loss, reduced reverberation, fewer multipaths and an improved data rate. Thus, multi-dimensional arrays can be employed to trade-off design complexity for improved parametric performance.

Unique Features of TMA Technology

For Medical Applications

A TMA approach according to an embodiment can be characterized by at least six (6) unique features for obtaining space-frequency diversity beamforming for various medical applications, namely:

a. Inducing both periosteal and endosteal healing of a long-bone fracture at the same time;

b. Enhancing the production of shear waves to promote maximum integrin response of the bone tissue extracellular matrix (ECM), in lieu of acoustic modal converters;

c. Making small angular adjustments to the insonifying beams in the fracture channel and along the bone tissue to efficiently improve overall healing;

d. Minimizing clutter interference in tissue parameter estimation;

e. Coding tissue space in frequency to enhance parameter estimation with FFT processing on receive; and f. Scanning tissue regions of interest in the high MHz (25-200 MHz) and low GHz (1-5 GHz) frequency domains for Dermatological and Scanning Acoustic Microscope applications, respectively.

From the foregoing, it will be appreciated by those skilled in the art that embodiments of the present disclosure can provide an effective method and apparatus that overcomes many of the limitations associated with the mechanical stimulation of biological materials.

For Underwater Sonar Applications

A TMA approach according to an embodiment can be characterized by at least eight (8) unique features for obtaining space-frequency diversity beamforming for underwater sonar applications, namely:

a. Greater near-field coverage by eliminating the "blind zone";

b. More detection resistant due to shorter transmission time;

c. Reduced cross-beam reverberation per receiving beam;

d. Simultaneous bearing-detection information;

e. Inherent reduction of mutual sonar interference;

f. Lower input power requirement for given OMNI source level;

g. Coding underwater volumes in frequency to enhance parameter estimation with FFT processing on receive; and h. Reduced hardware complexity for multi-beam formation.

It will also be readily appreciated by one with ordinary skill in the art use a method and apparatus according to embodiments of the disclosure in a variety of sonar applications, such as multi-mode echo-ranging, the detection of deep moored mines, and submarine active sonar. It may also provide a multi-beam formation capability for circular and planar arrays.

Although certain exemplary embodiments of the present disclosure have been specifically described herein, it will be apparent to those skilled in the art to which embodiments of the disclosure pertain that variations and modifications of the various embodiments shown and described herein may be made without departing from the spirit and scope of this disclosure.

REFERENCES

U.S. Pat. No. 2,426,460 "System for Locating a Radiated-Signal Reflector", Lewis H. M., Aug. 26, 1947.

U.S. Pat. No. 2,852,772, "Receiver Scanning System", Gitzdanner L. G., Sep. 16, 1958.

U.S. Pat. No. 3,012,244, "Receiver Scanning System", Langenwalter D. F. and Stevenson M., Dec. 5, 1961

1. Winder A. A. and Loda C. J., *Introduction to Acoustical Space-Time Information Processing*, Office of Naval Research, Washington, DC/ONR Report ACR-63, January 1963.

2. Horton J. W., *Fundamentals of Sonar*, U.S. Naval Institute, Annapolis, MD), 1957.

3. Urick R. J., *Principles of Underwater Sound for Engineers*, McGraw-Hill Book Co, New York, 1967.

4. Shelkunoff S. A., *Theory of Antennas of Arbitrary Size and Shape*, Proc. IRE, Vol. 29, 493-521, September 1941.

5. Shelkunoff S. A., *A Mathematical Theory of Linear Arrays*, BSTJ, Vol. 22, 80-107, January 1943.

6. Shnitkin H., *Survey of Electronically Scanned Antennas*, The Microwave Journal, Part 1:67-72, December 1960; Part 2: 57-64, January 1961.

7. Shanks H. E., *A New Technique for Electronic Scanning*, IRE Transactions on Antennas and Propagation, 162-166, March 1961.

8. Kummer W. H., Villeneuve A. T., Fong T. S., and Terrio F. G., *Ultra-Low Sidelobes from Time-Modulated Arrays*, IEEE Trans on Antennas and Propagation, 633-639, November 1963.

9. Davies D. E. N. and McCartney B. S., *Cylindrical Arrays with Electronic Beam Steering*, Proc. IEEE, Vol. 112, No. 3, March 1965.

10. Johnson, M. A., *Phased-Array Beam Steering by Multiplex Sampling*, Proc. IEEE, Vol. 56, No. 11, 1802-1811, November 1968.

11. Cole B. F. and Hanrahan J. J., *Influence of Beamwidth and Multiple Transmissions on Reverberation-Limited Sonars*, JASA, Vol. 43, No. 6, 1373-1377, 1968.

12. Eyring C., Christensen R., Raitt R., *Reverberation in the Sea*, JASA, Vol. 20, 462-475, 1948.

13. Westerfelt P. J., *Parametric Acoustic Array*, J. Acoust. Soc. Am., 35, 535-537, 1963.

14. Voglis G. M., *A General Treatment of Modulation Scanning as Applied to Acoustic Linear Arrays*, Ultrasonics, Part 1: Vol. 9, No. 3, 142-153, July 1971; Part 2: Vol. 10, No. 3, 103-113, May 1972.

15. Winder A. A., *Sonar System Technology*, IEEE Trans Sonics & Ultrasonics, SU-22, No. 5, 291-332, September 1975.

16. Haykin S., *Multiple-Beam Sampler for Continuously Scanned Array Antennas*, IRE Trans. on Antennas and Propagation, 526-528, July 1976.

17. Machado P., Li J, Blackman R., Liu J-B., Kepler C., Fang T., Muratore R., Winder J., Winder A. and Forsberg F., *Comparison Between Clinically Available Low Intensity Pulsed Ultrasound (LIPUS) and a Novel BiModal Acoustic Signal System for Accelerating Fracture Healing*, UFFC pending acceptance, Winter 2021.

18. Winder A. and Muratore R., *Ultrasound Stimulation in Musculo-Skeletal Tissue Structures*, WIPO International Publication No. WO 2020/154633, Jul. 30, 2020.

What is claimed is:

1. A method for generating a spatial distribution of acoustic transmitting frequencies by a time modulated array (TMA) of transducers that produce simultaneous multiple beam steering in a non-linear propagation medium, comprising the steps of:

generating, by a tapped delay line, a plurality of pulsed sampling signals, wherein each pulsed sampling signal includes a series of frequency harmonics and successive signals of the plurality of pulsed sampling signals are separated by a predetermined delay time;

mixing each of the plurality of pulsed sampling signals with a time-limited information signal wherein a plurality of mixer output signals is generated;

bandpass filtering each of the plurality of mixer output signals;

generating a first plurality of simultaneous TMA beams from the plurality of filtered and weighted output signals by driving a plurality of acoustic transducers in a spatial array of acoustic transducers, wherein each beam of the first plurality of simultaneous beams is associated with one of a plurality of transmitting carrier frequencies, wherein a bearing-target doppler ambiguity, a uniform response in bearing, out-of-band spectra leakage interference, peak power level, and cross-beam reverberation are controlled in the first plurality of simultaneous beams, and a secondary plurality of beams is formed that includes a plurality of different primary carrier frequencies that intersect the first plurality of simultaneous TMA beams in a far-field, wherein a parametric sonar array is produced;

receiving multiple echo frequencies of the first and second plurality of TMA simultaneous beams at a spectrum analyzer; and, processing the multiple echo frequencies of the first and second plurality of TMA simultaneous beams with the spectrum analyzer, wherein each spectral component of the multiple echo frequencies corresponds to a unique spatial bearing.

2. The method of claim 1, further comprising producing a spectral component with a phase slope that corresponds to a particular beam steering angle by time-modulating each array element in a spatial array.

3. The method of claim 1, where the spatial beamformer comprises two sub-beamformers, wherein one or both are TMA beamformers, whose output intersects in a specific region in the far-field with one or more common maximum response axes (MRAs).

4. The method of claim 1, wherein the spatial array is an N-point element linear array with constant element spacing d and a time-varying far-field pressure for a monochromatic signal is given as:

$$p(\theta, t) = \sum_p a_p \sum_m W_m$$

$$\left\{ \exp\left( j2\pi m \left[ \frac{(f_r + \epsilon f_0 + p f_s)d \sin(\theta)}{c} - \frac{p}{N} \right] \right) \times \exp\left( j2\pi (f_r + \epsilon f_0 + p f_s)t \right) \right\},$$

wherein $\theta$ is a pointing angle, which is a direction of maximum response for a particular beam associated with a harmonic number, $a_p$ are weighting coefficients for each harmonic p, $W_m$ is a complex weighting for each element m, $f_r$ is a reference frequency, $f_s$ is a fundamental harmonic frequency, $f_o$ is a transmit frequency, p ranges from a first harmonic $P_o$ to a last harmonic $P_c$, c is the speed of sound, and $\epsilon$ is +1 or −1 depending on whether a sum or difference frequency band is retained.

5. The method of claim 4, further comprising choosing a total delay time t equal to a sampling period, $N\tau=1/f_s$, wherein $\tau=-d\sin(\theta)/c$, and the pointing angle $\theta$ is a function of the harmonic parameters (p) and ($f_s$), the center frequency $f_c=f_r+\epsilon f_o$, and the array parameters (N) and (d).

6. The method of claim 5, wherein a sampling frequency $f_s$ is at least: $f_s=f_D+6/T$, wherein $f_D$ is the maximum doppler and T is the signal pulse length.

7. The method of claim 5, wherein out-of-band spectra leakage interference is controlled by setting $2f_o \geq (P_c-P_o)f_s$, wherein ($f_s$) is a sampling frequency that includes spreading due to source, target and receiver speeds.

8. The method of claim 7, wherein the pointing angle $\theta p = \sin^{-1}[2\pi p/(Nk_p d)]$, wherein $k_p$ is a harmonic dependent wave-number that equals $2\pi(f_r+\epsilon f_o+pf_s)/c$.

9. The method of claim 4, wherein, when the information signal is s(t) has a complex Fourier spectrum S(f), the time-varying far-field pressure is expressed by:

$$p(\theta, t) = \sum_p a_p$$

$$\int df' S(f') \left\{ \sum_m W_m \left\{ \exp\left( j2\pi m \left[ \frac{(f' + f_r + \epsilon f_0 + pf_s)d\sin(\theta)}{c} - p/N \right] \right) \right\} \times \right.$$

$$\left. \exp\left( j2\pi(f' + f_r + \epsilon f_0 + pf_s)t \right) \right\}.$$

10. The method of claim 4, wherein the total peak power required for M tonals is $(2M^2 P_{rms})$, wherein $P_{rms}$ is an rms power per tonal required for a specified source level.

11. The method of claim 4, wherein a transmit source level of the TMA $SL_{TMA}$ for the linear array with a constant input electrical power is equal to transmit source level of the linear array $SL_{LIN}$ reduced by the number of frequency coded beams according to $$SL_{TMA}=SL_{LIN}-10\log M,$$

wherein $SL_{TMA}=20\log$ rms pressure on the MRA.

12. The method of claim 1, wherein the spatial array is an N-point element circular array with constant angular element spacing $\zeta$, and a time-varying far-field pressure for an arbitrary signal with complex Fourier spectrum S(f) is given as:

$$p(\theta, t) = \sum_p a_p$$

$$\int df' S(f') \left\{ \sum_m W_m \exp\left( -j2\pi \left[ \left( f_p(R/c) \right) \left( \cos(\theta - m\zeta) - \cos(\theta) + pm/N \right) \right] \right) \right\} \times$$

$$\exp(j2\pi f_p t),$$

wherein $\theta$ is a pointing angle, which is a direction of maximum response for a particular beam associated with a harmonic number, $a_p$ are weighting coefficients for each harmonic p, $W_m$ is a complex weighting for each element m, $f_p=(f'+f_r+\epsilon f_o+pf_s)$ where $f_r$ is a reference frequency, $f_s$ is a fundamental harmonic frequency, $f_o$ is a transmit frequency, p ranges from a first harmonic $P_o$ to a last harmonic $P_c$, R is the radius of the circular array, c is the speed of sound, and $\epsilon$ is +1 or −1 depending on whether a sum or difference frequency band is retained.

13. The method of claim 12, further comprising additional phase weightings that enhance spatial filtering, wherein each element is phased back-to-a-line or to a circular arc for maximum signal echo-to-noise ratio.

14. The method of claim 1, further comprising selecting frequencies that decrease the coherence of the spatially interacting beams that transmit major lobes wherein one or more of a cross-beam masking clutter or a reverberation level is reduced.

15. The method of claim 1, wherein the spatial array is a planar array of $N_1$-point elements with an inter-element $d_1$-spacing in a first direction and $N_2$-point elements with an inter-element $d_2$-spacing in a second direction that is excited by complex signal $s(t)=2u(t)\cos\omega_o tu(t)$ that represents a low-frequency amplitude modulation u (t) with carrier frequency $\omega_o$ and whose complex Fourier spectrum is $S(\omega')=U(\omega'+\omega_o)+U(\omega'-\omega_o)$, wherein a time-varying far-field pressure for an arbitrary signal with complex Fourier spectrum S(f) is given as:

$$p(\alpha, \beta, t) = \frac{1}{2\pi}$$

$$\sum_{P_1,P_2} a_{p_1} a_{p_2} \int d\omega' U(\omega' - \epsilon_1 \omega_0) \left\{ \exp\left( j(m_1 - 1) \left[ \frac{\omega_{12} d_1 \cos(\alpha)}{c} - \frac{2\pi p_1}{N_1} \right] \right) \right\} \times$$

$$\left\{ \exp\left( j(m_2 - 1) \left[ \frac{\omega_{12} d_2 \cos(\beta)}{c} - \frac{2\pi p_2}{N_2} \right] \right) \right\}$$

where $\alpha$ and $\beta$ are the direction cosines of a far-field observation point with respect to the 1-direction and 2-direction, respectively, $\omega_{12}=\omega_{r_1}+\omega'+\epsilon_2\omega_{r_2}+p_1\omega_{s_1}+p_2\omega_{s_2}$ is a frequency of a $p_1 p_2$-harmonic, and c is the speed of sound, wherein the direction cosines of the individual beam MRA's are defined as:

$$\cos\alpha=(2\pi p_1/N_1)(c/d_1\omega_{12}), \text{ and}$$

$$\cos\beta=(2\pi p_2/N_2)(c/d_2\omega_{12}).$$

16. The method of claim 1, wherein the spatial array further comprises a dual beamformer that generates a set of collinear first difference primary frequencies, wherein the first beamformer includes a set of beams of a multi-element TMA array and a second beamformer produces a wide-beam that encompasses all major TMA transmission lobes for deep depth underwater applications, wherein a source level of the wide beam is equal to a peak source level of the TMA array.

17. The method of claim 16, wherein the set of collinear first difference primary frequencies $\{\Delta f_i\}$ is defined as $$\{\Delta f_i\} = |\{\text{Wide Beam}\} - \{TMA_i\}|_{abs}$$

$$= \{16\,\text{kHz}\} - (12.17\,\text{kHz}, 13.00\,\text{kHz}, 13.83\,\text{kHz}, 14.68\,\text{kHz}\}$$

$$= \{3.83\,\text{kHz}, 3.0\,\text{kHz}, 2.17\,\text{kHz}, 1.34\,\text{kHz}\}.$$

18. The method of claim 17, wherein the collinear first difference frequencies include transmission spectra whose echoes are input to a spectrum analyzer.

19. The method of claim 17, wherein the collinear first difference frequencies for the parametric array maintain a high efficiency in the demodulation process, wherein the frequency down-ratio is 3-to-10.

20. The method of claim 1, further comprising filtering each of the plurality of mixer output signals wherein one of a sum-frequency sideband or a difference frequency sideband is filtered from each of the plurality of mixer output signals.

21. The method of claim 1, further comprising complex weighting each of the plurality of mixer output signals.

22. The method of claim 1, wherein the bandpass filtering is one of a sum frequency band pass filtering or a difference frequency bandpass filtering.

23. The method of claim 1, wherein the different primary carrier frequencies of the plurality of different primary carrier frequencies are one of lower primary carrier frequencies or higher primary carrier frequencies.

24. An acoustic space-frequency diversity system, comprising:

a tapped delay line includes a plurality of taps that generate a plurality of pulsed sampling signals, wherein each tap generates one of the plurality of pulsed sampling signals, each pulsed sampling signal includes a series of frequency harmonics, and successive signals of the plurality of pulsed sampling signals are separated by a predetermined delay time;

a plurality of mixers, wherein each mixer of the plurality of mixers combines one of the plurality of pulsed sampling signals with a time limited information signal to generate one of a plurality of mixer output signals; and a spatial array of transducer elements, where each transducer element of the spatial array of transducer elements receives one of the plurality of mixer output signals, wherein the spatial array of transducer elements generates from the plurality of mixer output signals a plurality of simultaneous beams wherein each beam of the plurality of simultaneous beams is associated with one of a plurality of carrier frequencies, wherein simultaneous beams are subject to design constraints that control a bearing-target doppler ambiguity, a uniform response in bearing, out-of-band spectra leakage interference, peak power level, and cross-beam reverberation are controlled in the first plurality of simultaneous beams upon receive.

25. The system of claim 24, wherein spatial array of transducer elements includes 3-rectangular elements that generate simultaneous endosteal and periosteal bone healing beam patterns, wherein each rectangular element measures 25 mm×3.4 mm with an inter-element spacing of 3.5 mm.

26. The system of claim 24, further comprising a set of bandpass filters, wherein each bandpass filter of the plurality of bandpass filters receives one of the plurality of mixer output signals and filters one of a sum-frequency side lobe or a difference frequency side lobe from the one of the plurality of mixer output signals.

27. The system of claim 24, wherein:

the bearing-target Doppler ambiguity is controlled by a sampling frequency and an array geometry, the uniform response in bearing is controlled by one or more of the array geometry or harmonic separation choices, the out-of-band leakage is controlled by one or more of a bandpass filter or a frequency separation rule, peak power is controlled by a power amplifier design and a number of harmonic beams, and cross-beam reverberation is controlled by one or more of assigning different carrier frequencies to each beam or by spatial beam steering geometry.

28. The method of claim 1, wherein:

the bearing-target Doppler ambiguity is controlled by a sampling frequency and an array geometry, the uniform response in bearing is controlled by one or more of the array geometry or harmonic separation choices, the out-of-band leakage is controlled by one or more of a bandpass filter or a frequency separation rule, peak power is controlled by a power amplifier design and a number of harmonic beams, and cross-beam reverberation is controlled by one or more of assigning different carrier frequencies to each beam or by spatial beam steering geometry.

* * * * *